United States Patent
Kang et al.

(10) Patent No.: US 10,184,554 B2
(45) Date of Patent: Jan. 22, 2019

(54) DIFFERENTIAL CARRIER CASE WITH INSERTED PIPE FOR HIGH PRESSURE CASTING

(71) Applicants: Hyundai Motor Company, Seoul (KR); Kia Motors Corporation, Seoul (KR); INZI AMT. co., ltd, Dangjin-gun (KR); Hyundai Dymos Incorporated, Seosan-si (KR)

(72) Inventors: Mun-Gu Kang, Suwon-Si (KR); Cheol-Ung Lee, Busan (KR); Kwang-Min Yoon, Suwon-si (KR); Hyung-Sop Yoon, Yongin-si (KR); Jung-Hwan Jang, Incheon (KR); Kyui-Joo Park, Dangjin-si (KR); Sung-Yong Jang, Dangjin-si (KR); Yo-Sub Han, Seoul (KR); Hoon-Gab Choi, Seoul (KR); Seung-Un Lim, Incheon (KR)

(73) Assignees: Hyundai Motor Company, Seoul (KR); Kia Motors Corporation, Seoul (KR); INZI AMT.co., ltd., Dangjin-gun (KR); Hyundai Dymos Incorporated, Seosan-si (KR)

( * ) Notice: Subject to any disclaimer, the term of this patent is extended or adjusted under 35 U.S.C. 154(b) by 0 days.

(21) Appl. No.: 15/351,734

(22) Filed: Nov. 15, 2016

(65) Prior Publication Data

US 2017/0370464 A1    Dec. 28, 2017

(30) Foreign Application Priority Data

Jun. 23, 2016 (KR) .......................... 10-2016-0078685

(51) Int. Cl.
*F16H 57/02* (2012.01)
*F16H 48/38* (2012.01)
(Continued)

(52) U.S. Cl.
CPC ............. *F16H 57/037* (2013.01); *B22C 9/10* (2013.01); *B22C 9/108* (2013.01); *B22C 21/14* (2013.01);
(Continued)

(58) Field of Classification Search
CPC ............... F16H 57/037; F16H 57/0424; F16H 2057/02017; F16H 48/38; F16H 57/12;
(Continued)

(56) References Cited

U.S. PATENT DOCUMENTS

| 5,111,872 A | 5/1992 | Diehl et al. |
| 6,623,867 B2 * | 9/2003 | Crocco ................. B22D 19/14 428/539.5 |

(Continued)

FOREIGN PATENT DOCUMENTS

| GB | 2 073 633 A | 10/1981 |
| JP | 57-41874 A | 3/1982 |

(Continued)

*Primary Examiner* — Adam D Rogers
(74) *Attorney, Agent, or Firm* — Morgan, Lewis & Bockius LLP

(57) ABSTRACT

A differential carrier case with an inserted pipe for high pressure casting may include a mold core into which a first end of a pipe is inserted, a mold core pin fixed to the mold core to fix the mold core and the first end of the pipe, a drive core pin inserted into a second end of the pipe, and a thick portion surrounding an outer portion of the pipe.

9 Claims, 29 Drawing Sheets

(51) Int. Cl.

| | |
|---|---|
| *F16H 57/04* | (2010.01) |
| *B22C 9/10* | (2006.01) |
| *B22D 17/20* | (2006.01) |
| *B22D 19/04* | (2006.01) |
| *F16H 57/037* | (2012.01) |
| *B22C 21/14* | (2006.01) |
| *B22D 17/24* | (2006.01) |
| *B22D 19/00* | (2006.01) |
| *B22D 19/16* | (2006.01) |
| *B22D 25/02* | (2006.01) |
| *C22C 21/00* | (2006.01) |
| *C22C 38/00* | (2006.01) |
| *C22C 38/02* | (2006.01) |
| *C22C 38/04* | (2006.01) |
| *C22C 38/40* | (2006.01) |
| *F16H 57/12* | (2006.01) |
| *F16H 61/36* | (2006.01) |

(52) U.S. Cl.
CPC .............. *B22D 17/20* (2013.01); *B22D 17/24* (2013.01); *B22D 19/00* (2013.01); *B22D 19/0036* (2013.01); *B22D 19/0072* (2013.01); *B22D 19/16* (2013.01); *B22D 25/02* (2013.01); *C22C 21/00* (2013.01); *C22C 38/002* (2013.01); *C22C 38/02* (2013.01); *C22C 38/04* (2013.01); *C22C 38/40* (2013.01); *F16H 48/38* (2013.01); *F16H 57/0424* (2013.01); *F16H 57/12* (2013.01); *F16H 61/36* (2013.01); *F16H 2057/02017* (2013.01)

(58) Field of Classification Search
CPC ........... F16H 61/36; B22C 9/108; B22C 9/10; B22C 21/14; B22D 17/20; B22D 19/00; B22D 25/02; B22D 17/24; B22D 19/0036; B22D 19/0072; B22D 19/16; C22C 21/00; C22C 38/002; C22C 38/02; C22C 38/04; C22C 38/40
See application file for complete search history.

(56) References Cited

U.S. PATENT DOCUMENTS

| | | | |
|---|---|---|---|
| 9,452,469 B2* | 9/2016 | Longa | ........................ B22C 7/06 |
| 9,452,682 B2* | 9/2016 | Triantos | ................. B60K 6/405 |
| 2017/0261093 A1* | 9/2017 | Yamamoto | .......... F16H 57/0424 |

FOREIGN PATENT DOCUMENTS

| | | |
|---|---|---|
| JP | 60-174246 A | 9/1985 |
| JP | 4-123854 A | 4/1992 |
| JP | 10-088269 A | 4/1998 |
| JP | 2000-071260 A | 3/2000 |
| JP | 2002-147583 A | 5/2002 |
| JP | 2003-290905 A | 10/2003 |
| JP | 2009-036050 A | 2/2009 |
| JP | 2013-244501 A | 12/2013 |
| KR | 2001-0111603 A | 12/2001 |
| KR | 10-1705170 B1 | 2/2017 |

* cited by examiner

FIG. 15
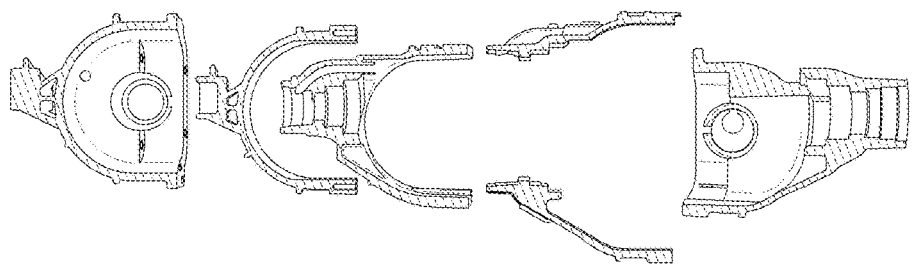
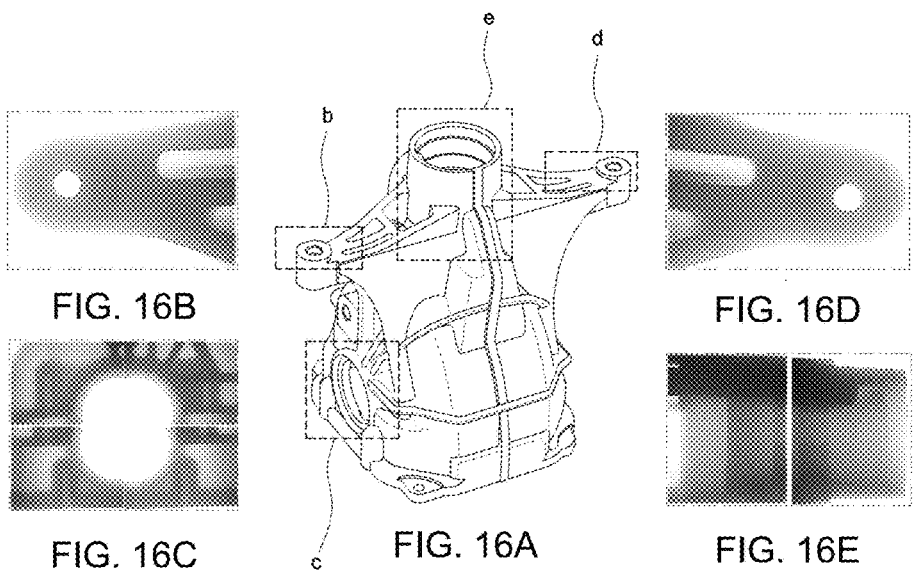
FIG. 16B
FIG. 16C
FIG. 16A
FIG. 16D
FIG. 16E

DIFFERENTIAL CARRIER CASE WITH INSERTED PIPE FOR HIGH PRESSURE CASTING

CROSS-REFERENCE TO RELATED APPLICATIONS

The present application claims priority to Korean Patent Application No. 10-2016-0078685, filed Jun. 23, 2016, the entire contents of which is incorporated herein for all purposes by this reference.

BACKGROUND OF THE INVENTION

Field of the Invention

The present invention relates to a differential carrier case with an inserted pipe for high pressure casting, and more particularly, to a differential carrier case for high pressure casting, in which a pipe is inserted and fixed without an external fixing device, such that no shrinkage defect occurs along a thick portion at the time of high pressure casting, and oil leakage and corrosion are prevented to ensure corrosion resistance.

Description of Related Art

In general, die casting is a high pressure mold casting process, and refers to a precise casting process of putting molten metal into a mold, which is made of steel and accurately machined to be completely consistent with a desired shape of a casting, so as to obtain a casting having the same shape as the mold. In addition, a product made by the die casting is referred to as a die cast casting.

As such, the die casting process is one of the mass-production casting processes using metal, and universally used to produce an automobile, a machine, an electric or electronic product, or a structural metallic item, which uses components made of lightweight metal, because of an integrated process of forming an actual shape, high productivity, utilization of low-priced material, and an excellent dimensional shape. Alloys of zinc, aluminum, tin, copper, magnesium, and the like are used as metal mainly used for the die casting process.

The die casting produces a product having accurate dimensions and excellent mechanical properties, and produces a precise product such that a machining process is almost not required. In addition, a casting product having a small thickness may be obtained, and a number of products may be produced by using a mold. However, a drawback of the die casting is that the die casting is not suitable to produce a small number of products because the mold is high-priced, and has weak points such as a lack of pressure resistance caused by an excessive amount of internally contained gas, a surface defect caused by a fractured layer, deterioration in strength and compactness caused by internal shrinkage cavities, and difficulty in dealing with undercuts, it is difficult to remove blisters which can be observed with the naked eye after surface processing of a product that needs to have an aesthetically attractive surface, and usually most blister defects commonly occur in a component that requires gastightness.

Meanwhile, to produce a product having a pipe inserted therein in the related art, a gravity casting process is performed to insert and cast a pipe, or a high pressure casting process is performed to produce a product to be machined, and then a shape of the pipe is formed in the product by hole machining using a gun drill. In the case of the related art which adopts the gravity casting process, the pipe is exposed to the outside of the mold, and the pipe may be easily fixed during the gravity casting process, and as a result, there is no difficulty while the process is performed.

In contrast, in the case of the related art which adopts the high pressure casting process, because molten metal is injected at a high speed and under high pressure, the pipe, which is inserted into a mold, needs to be necessarily firmly fixed, in order to inhibit scattering of molten metal and ensure a dimension of the product at the periphery of the pipe. However, because a pipe device for securely fixing the pipe having a three-dimensional shape to a high pressure casting mold has not yet been implemented up to now, there are a lot of problems to apply a pipe into a component to be manufactured by the high pressure casting process.

In the related art, a differential carrier case is required to have noise, vibration, and harshness (NVH) performance, and as a result, a cast iron material having high rigidity is applied to a mold casting process, and a passageway for lubricating oil to be circulated in the differential carrier case is formed by right-angled numerical control (NC) hole machining which is a post-process. In addition, in a case in which an aluminum alloy is applied for the purpose of weight reduction, the high pressure casting process needs to be carried out instead of the gravity casting process because of a problem of expense, and an internal lubricating oil passageway is formed by a post-process for the product in the same manner.

In general, regarding a thickness of the product for each casting process, a thickness of aluminum for the gravity casting process is 3.0 mm to 20.0 mm, and a thickness of aluminum for the high pressure casting process is 3.5 mm to 4.0 mm. However, in a case in which the lubricating oil passageway is machined by the post-process at the time of the aluminum high pressure casting process, a shrinkage defect occurs due to a thick portion because of a smaller thickness than in the gravity casting process. For this reason, oil leakage and water leakage occur, and as a result, the high pressure casting process cannot be easily applied because it is difficult to manufacture a component having a thick portion where the lubricating oil passageway is present. Furthermore, there is a problem in that durability and quality of the final product deteriorate even though the high pressure casting process is applied to a small component.

Therefore, in order to solve the problems in the related art, it is necessary to design the fixing device so that the fixing device is not exposed to the outside in order to manufacture a product having excellent quality, and it is necessary to prevent any further occurrence of the shrinkage defect along a thick portion by enabling the manufacturing of a thick portion which is difficult to be implemented by the high pressure casting process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Therefore, various aspects of the present invention are directed to solving the aforementioned problems by manufacturing a precise electrode having a small thickness, and reducing manufacturing costs.

Various aspects of the present invention are directed to providing an effect of reducing costs by reducing the number of processes because a pipe is inserted and fixed without an external fixing device, such that it is not necessary to seal a portion of the pipe which is exposed to the outside.

Additionally, various aspects of the present invention are directed to providing a differential carrier case with an inserted pipe for high pressure casting and a method of manufacturing the same, which prevent a shrinkage defect, oil leakage, and corrosion by enabling a thick portion to be formed by a pipe which is inserted without being exposed to the outside.

According to various aspects of the present invention, a differential carrier case with an inserted pipe for high pressure casting may include a mold core into which a first end of a pipe is inserted, a mold core pin fixed to the mold core to fix the mold core and the first end of the pipe, a drive core pin inserted into a second end of the pipe, and a thick portion surrounding an outer portion of the pipe.

The first end of the pipe may be formed to have a first concave-convex portion, and a portion of the mold core into which the first end of the pipe is inserted may be formed to have a second concave-convex portion, such that the first concave-convex portion at the first end of the pipe and the second concave-convex portion of the mold core may be fixedly coupled.

A protruding portion may be additionally formed on an outer diameter at the first end of the pipe, and a depressed portion may be formed in the mold core to have a shape corresponding to the protrusion portion, such that the first end of the pipe may be inserted and fixed to the mold core.

The first end of the pipe may be formed in a quadrangular shape, and inserted and fixed to the mold core.

The first end of the pipe may be formed in an elliptical shape, and inserted and fixed to the mold core.

A material of the pipe may be selected from the group including an aluminum alloy, carbon steel, and stainless steel.

The thick portion may be selected from the group including an aluminum alloy and a magnesium alloy.

A thickness of the thick portion may range from 2.0 mm to 35.0 mm.

According to various aspects of the present invention, a method of manufacturing a differential carrier case with an inserted pipe for high pressure casting may include two-axis fixing of the pipe, in which a first end of a pipe may be inserted into a mold core, and the pipe may be inserted and fixed to a mold core pin fixed to the mold core to fix the mold core and first end of the pipe, three-axis fixing of the pipe, in which the pipe may be fixed by a drive core pin inserted into a second end of the pipe, and high pressure casting, in which molten metal may be casted by being injected into the mold core under high pressure.

According to the differential carrier case with an inserted pipe for high pressure casting according to various embodiments of the present invention, because a pipe is inserted and fixed without an external fixing device, and it is not necessary to seal a portion of the pipe which is exposed to the outside, the number of processes is reduced, thereby reducing costs.

According to the differential carrier case with an inserted pipe for high pressure casting according to various embodiments of the present invention, the thick portion may be formed by the pipe inserted without being exposed to the outside, and as a result, no shrinkage defect occurs, and oil leakage and corrosion are prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 15 is a photograph of a cutting inspection for a front portion of the differential carrier case according to various embodiments of the present invention.

FIG. 16A, FIG. 16B, FIG. 16C, FIG. 16D, and FIG. 16E are computerized tomography (CT) photographs of the differential carrier case with the inserted pipe for high pressure casting according to various embodiments of the present invention.

Figure 1A:
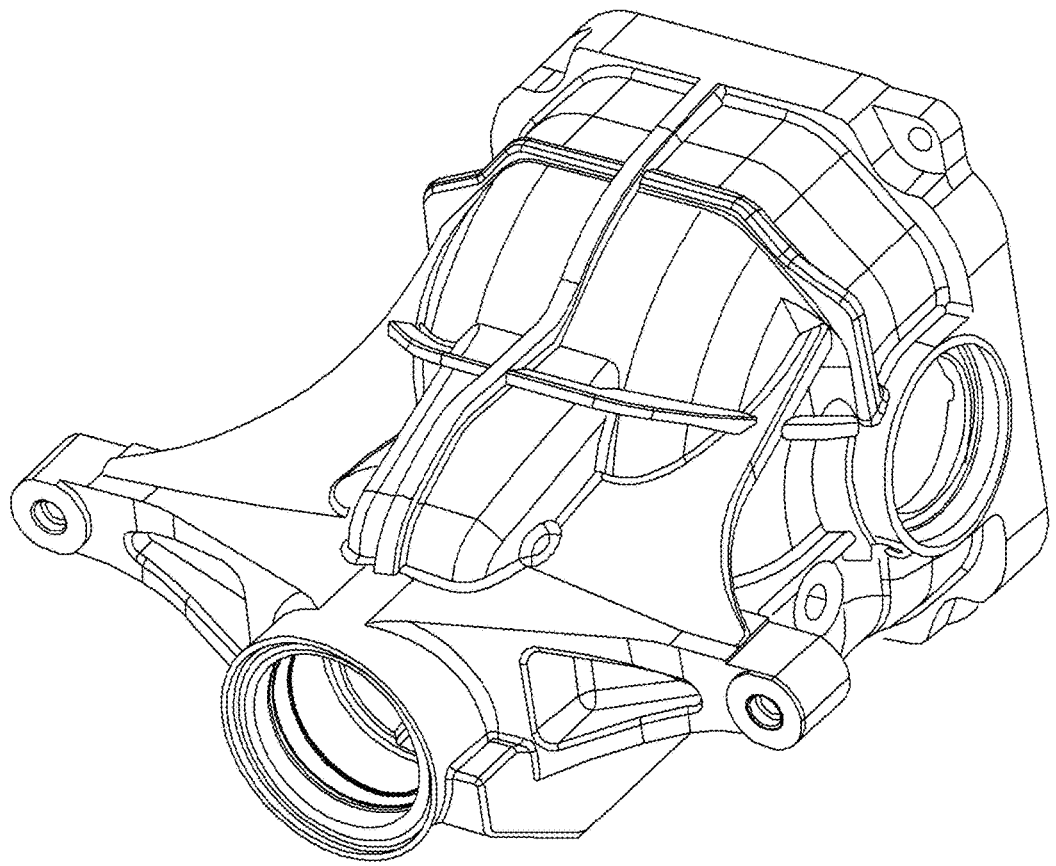
FIG. 1A is a configuration diagram of an upper surface of a differential carrier case in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a differential carrier case with an inserted pipe for high pressure casting and a method of manufacturing the same. Various embodiments of the present invention are directed to a differential carrier case with an inserted pipe for high pressure casting.

In the related art, a differential carrier case is required to have noise, vibration, and harshness (NVH) performance, and as a result, a mold casting process is applied to a cast iron material having high rigidity, and a passageway for lubricating oil to be circulated in the differential carrier case is formed by right-angled numerical control (NC) hole machining which is a post-process. In addition, in a case in which an aluminum alloy is applied for the purpose of weight reduction, the high pressure die-casting process needs to be carried out instead of the gravity casting process because of a problem of manufacturing costs, and an internal lubricating oil passageway is formed by a post-process for the product in the same manner.

Regarding a thickness of the product for each casting process, a thickness of aluminum for the gravity casting process is 3.0 mm to 20.0 mm, and a thickness of aluminum for the high pressure casting process is 3.5 mm to 4.0 mm. However, in a case in which the lubricating oil passageway is machined by the post-process at the time of the aluminum high pressure casting, a shrinkage defect 111 occurs due to a thick portion because of a smaller thickness than in the gravity casting process. The thick portion refers to a thick part of a product, a great shrinkage occurs all at once when the thick portion of the product is solidified, and a defect resulting from the great shrinkage, refers to the shrinkage defect 111. For this reason, oil leakage and water leakage occur, and as a result, the high pressure casting process cannot be easily applied because it is difficult to manufacture a component having a thick portion where the lubricating oil passageway is present. Furthermore, there is a problem in that durability and quality of the final product deteriorate even though the high pressure casting process is applied to a small component.

Therefore, in order to solve the problems in the related art, it is necessary to design a fixing device 11 so that the fixing device 11 is not exposed to the outside in order to manufacture a product having excellent quality, and it is necessary to prevent any further occurrence of the shrinkage defect 111 along a thick portion by enabling the manufacturing of a thick portion which is difficult to be implemented by the high pressure casting process.

Therefore, a differential carrier case with an inserted pipe for high pressure casting according to various embodiments of the present invention includes a mold core 105 into which one end of a pipe 100 is inserted, a mold core pin 101 which is fixed to the mold core 105 so as to fix the mold core 105 and one end of the pipe 100, a drive core pin 103 which is inserted into the other end of the pipe 100, and a thick portion which surrounds an outer portion of the pipe 100.

Meanwhile, according to a method of manufacturing the differential carrier case according to various embodiments of the present invention, one end of the pipe 100 is inserted into the mold core 105, and the pipe 100 is inserted into the mold core pin 101 fixed to the mold core 105 so as to fix the mold core 105 and one end of the pipe 100, such that one end of the pipe 100 is fixed so that the pipe 100 cannot be rotated, and as a result, the pipe 100 is subjected to a single-axis fixing step and a two-axis fixing step.

With the drive core pin 103 which is inserted into the other end of the pipe 100, the other end of the pipe 100 is fixed on the three axes, and as a result, the pipe 100 is subjected to a three-axis fixing step. According to various embodiments of the present invention, after the three-axis fixing step, the method includes a high pressure casting step in which molten metal is casted by being injected into the mold core 105 under high pressure, and a shape of the differential carrier case is made after a solidification step.

Therefore, in the two-axis fixing step for one end of the pipe according to various embodiments of the present invention, one end of the pipe 100 is formed to have a first concave-convex portion 107, and a portion of the mold core 105 into which one end of the pipe 100 is inserted is processed to have a second concave-convex portion 109. Therefore, the first concave-convex portion 107 at one end of the pipe 100 and the second concave-convex portion 109 of the mold core 105 are coupled to each other, and as a result, one end of the pipe 100 may be fixed on the two axes so that the pipe 100 cannot be rotated leftward and rightward. In addition, a protruding portion is additionally formed on an outer diameter portion at one end of the pipe 100 according to the present invention, and a depressed portion is formed in the mold core 105 so as to have a shape corresponding to the protruding portion, and as a result, one end of the pipe 100 is inserted and fixed to the mold core 105, and the pipe 100 may be fixed on the two axes so that the pipe 100 cannot be rotated leftward and rightward. Furthermore, one end of the pipe 100 is formed in a quadrangular shape and fixed, or one end of the pipe 100 is formed in an elliptical shape, and the mold core 105 is formed to have a shape corresponding to the shape of one end of the pipe 100, and then coupled to one end of the pipe 100. Therefore, one end of the pipe 100 is fixed on the single axis such that the pipe 100 cannot be rotated leftward and rightward, and as a result, the pipe 100 may be fixed as the pipe 100 is fixed on the two axes through the two-axis fixing step.

In the present invention, a material of the pipe 100 includes an aluminum alloy, carbon steel, or stainless steel. In addition, a thick portion of the differential carrier case according to the present invention is made of an aluminum alloy or a magnesium alloy, and a thickness of the thick portion is 2.0 mm to 35.0 mm.

Figure 1B:
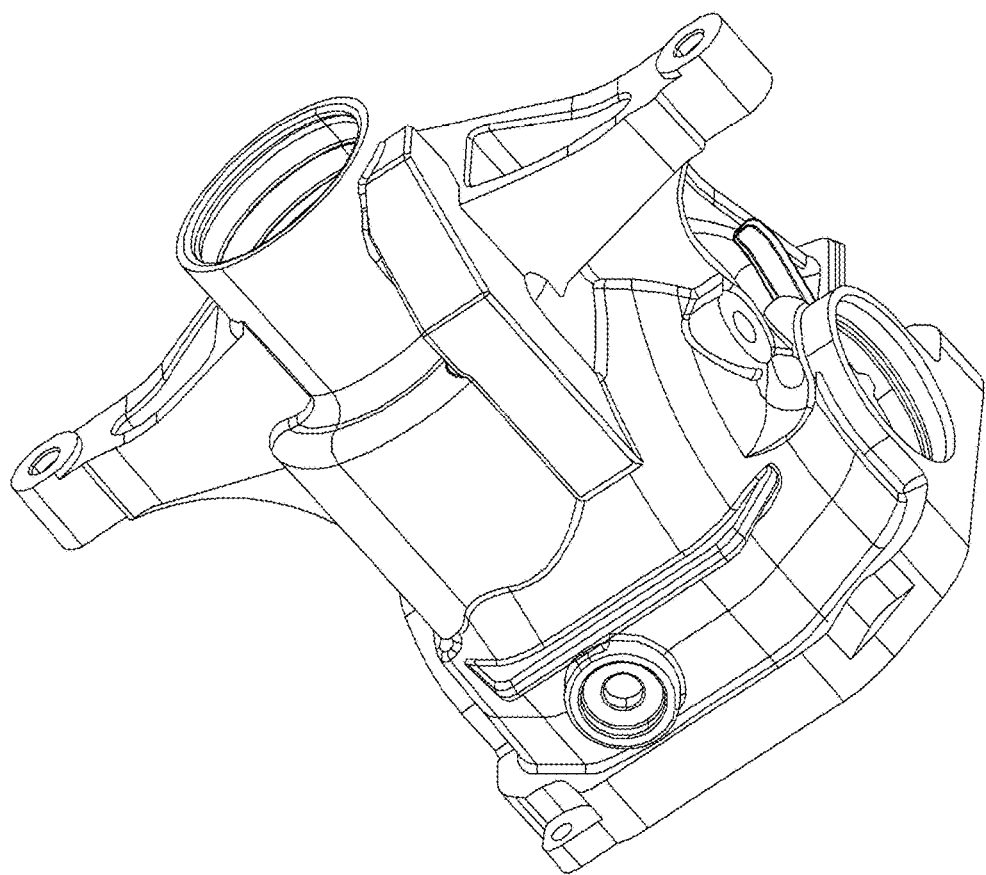
FIG. 1B is a configuration diagram of a lower surface of the differential carrier case in the related art.
Figure 1C:
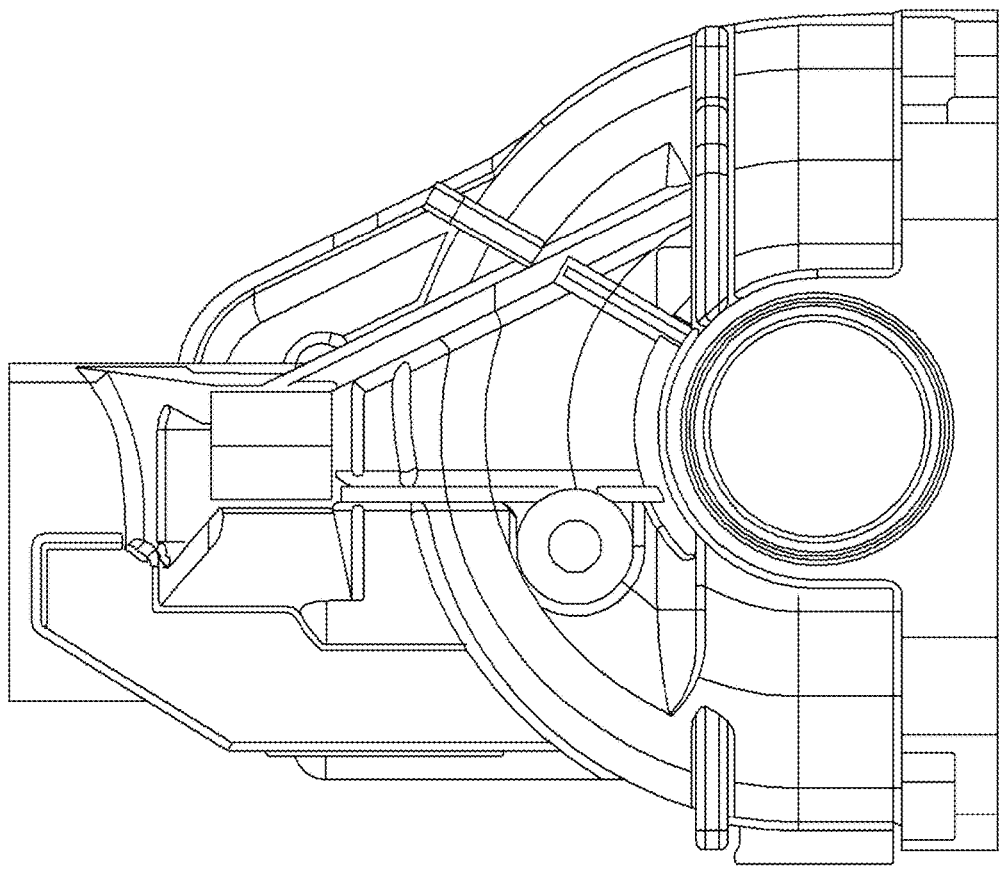
FIG. 1C is a configuration diagram of a side surface of the differential carrier case in the related art.

FIG. 1A is a configuration diagram of an upper surface of a differential carrier case in the related art, FIG. 1B is a configuration diagram of a lower surface of the differential carrier case in the related art, and FIG. 1C is a configuration diagram of a side surface of the differential carrier case in the related art. Referring to FIGS. 1A, 1B, and 1C, it can be seen that no pipe is inserted into the differential carrier case.

Figure 3A:
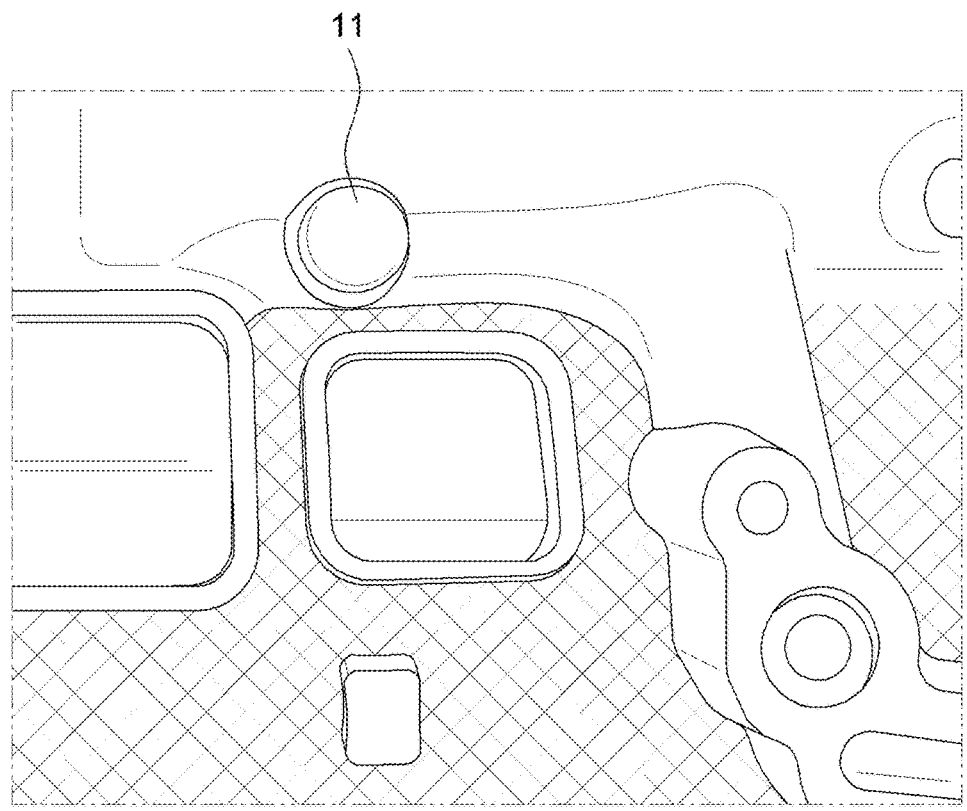
FIG. 3A is an enlarged photograph of a fixing device in the related art which is fixed and exposed to the outside.
Figure 3B:
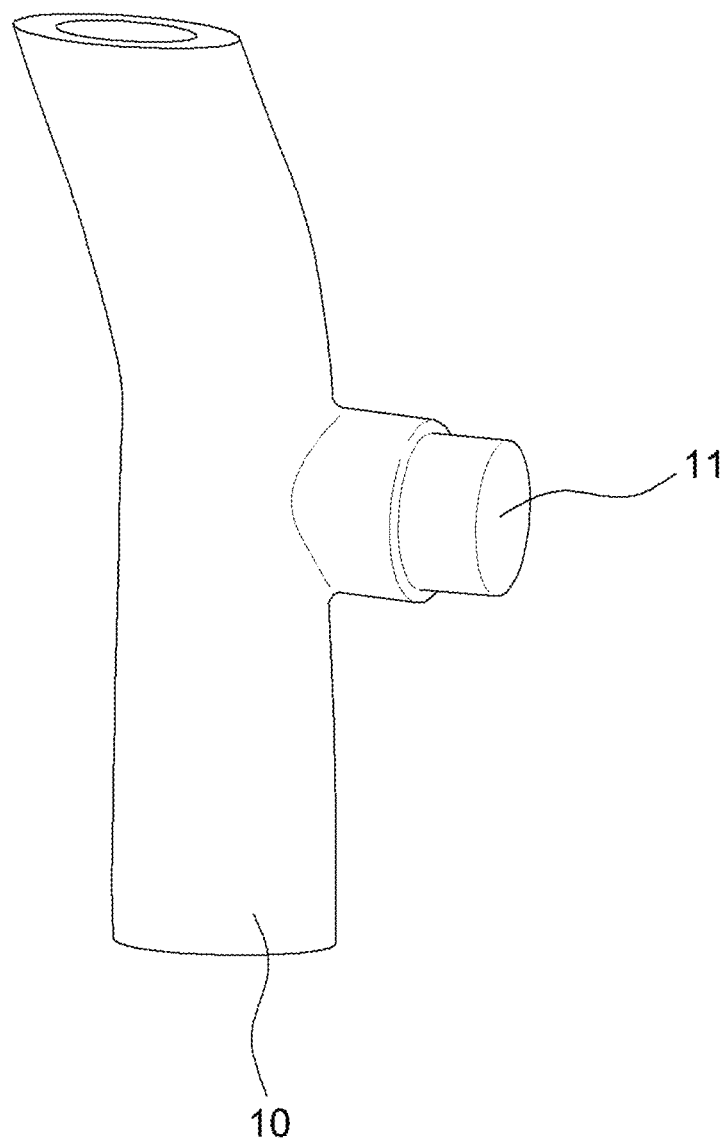
FIG. 3B is a configuration diagram of a pipe and the fixing device in the related art.
Figure 3C:
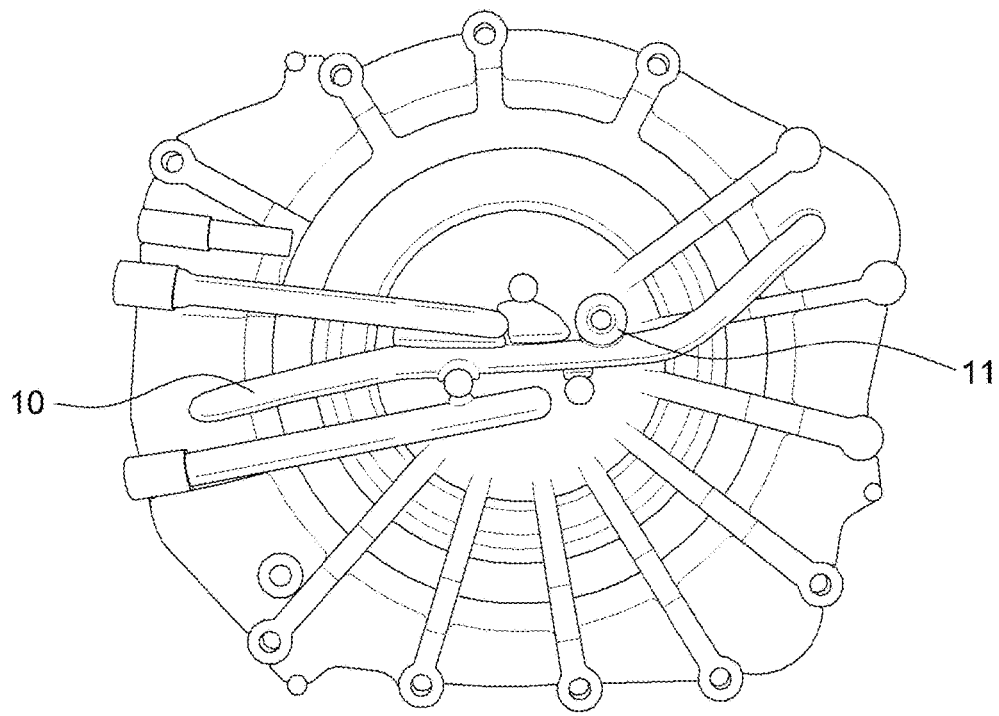
FIG. 3C is a photograph of the pipe and the fixing device in the related art which are fixed and exposed to the outside.
Figure 3D:
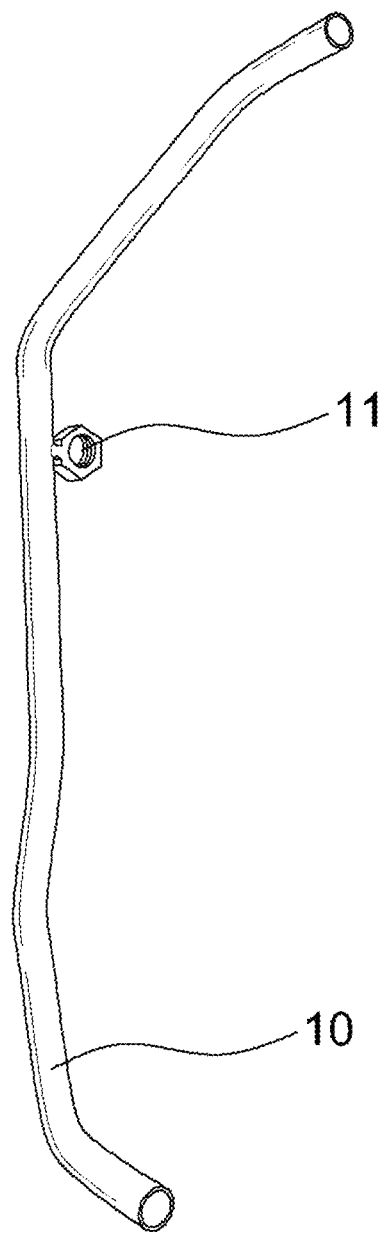
FIG. 3D is a photograph of the pipe and the fixing device in the related art.

FIG. 3A is an enlarged photograph of a fixing device 11 in the related art which is fixed and exposed to the outside, FIG. 3B is a configuration diagram of a pipe 10 and the fixing device 11 in the related art, FIG. 3C is a photograph of the pipe 10 and the fixing device 11 in the related art which are fixed and exposed to the outside, and FIG. 3D is a photograph of the pipe 10 and the fixing device 11 in the related art. In the related art, referring to FIGS. 3A, 3B, and 3C, it can be seen that the fixing device 11 for fixing the pipe 10 is exposed to the outside.

More specifically, as can be seen from FIGS. 3B and 3D, the pipe 10 in the related art, which includes the pipe 10 and the fixing device 11 exposed to the outside, is inserted into the product. As illustrated in FIG. 3C, it can be seen that the pipe 10 having a curved shape is fixed by the fixing device 11, and as can be seen from FIG. 3A, the fixing device 11 is exposed to the outside. The fixing device 11 serves to fix the pipe 10 so that the pipe 10 is not swayed by molten metal during a process of injecting the molten metal. However, since the pipe fixing device 11 is exposed to the outside, oil leakage and corrosion occur in the product. In contrast, the pipe 100 according to various embodiments of the present invention is basically prevented from being exposed to the outside, and as a result, it is possible to inhibit oil leakage and corrosion.

Figure 2A:
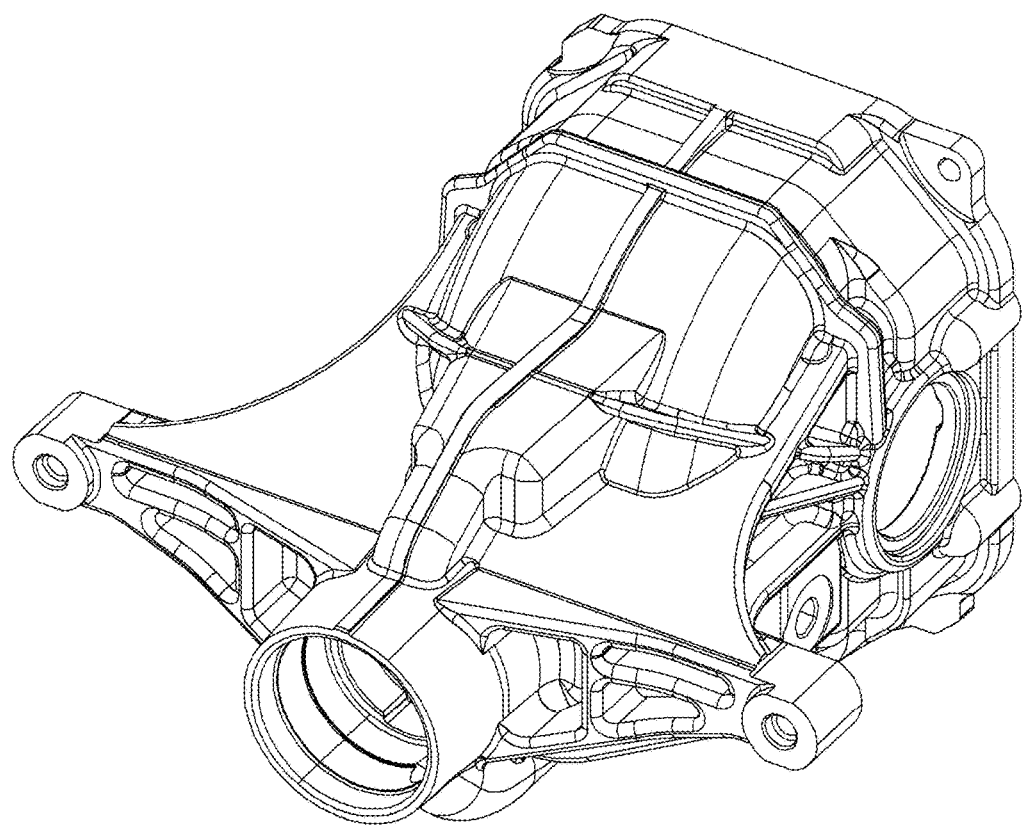
FIG. 2A is a configuration diagram of an upper surface of a differential carrier case according to various embodiments of the present invention.
Figure 2B:
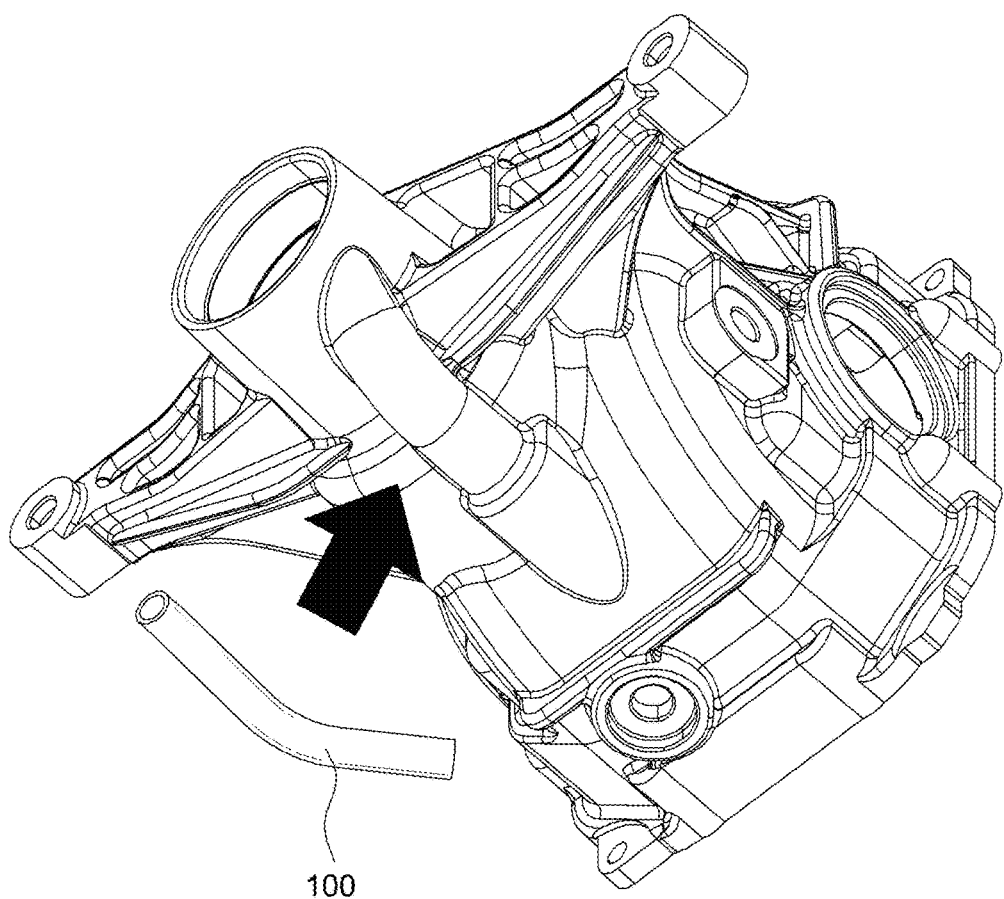
FIG. 2B is a configuration diagram of a lower surface of the differential carrier case according to various embodiments of the present invention.
Figure 2C:
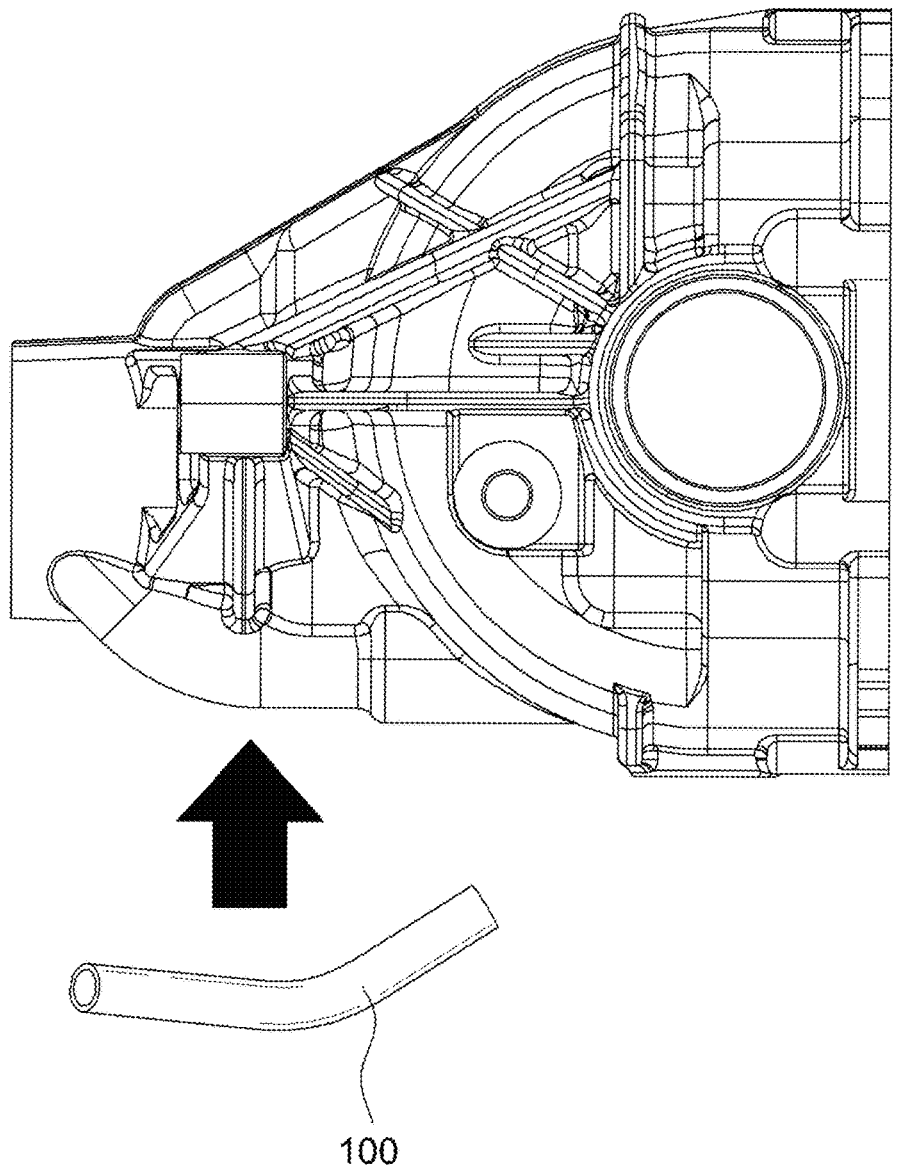
FIG. 2C is a configuration diagram of a side surface of the differential carrier case according to various embodiments of the present invention.

FIG. 2A is a configuration diagram of an upper surface of a differential carrier case according to various embodiments of the present invention, FIG. 2B is a configuration diagram of a lower surface of the differential carrier case according to the various embodiments of the present invention, and FIG. 2C is a configuration diagram of a side surface of the differential carrier case according to various embodiments of the present invention. As can be seen from FIG. 2B, the pipe 100 is inserted into the lower surface of the differential carrier case, and this configuration can be seen from the side surface of the differential carrier case in FIG. 2C. Since the pipe 100 is inserted as described above, the thick portion may be formed, and the shrinkage defect, which occurs in the related art, may be inhibited, thereby ensuring corrosion resistance.

Figure 4A:
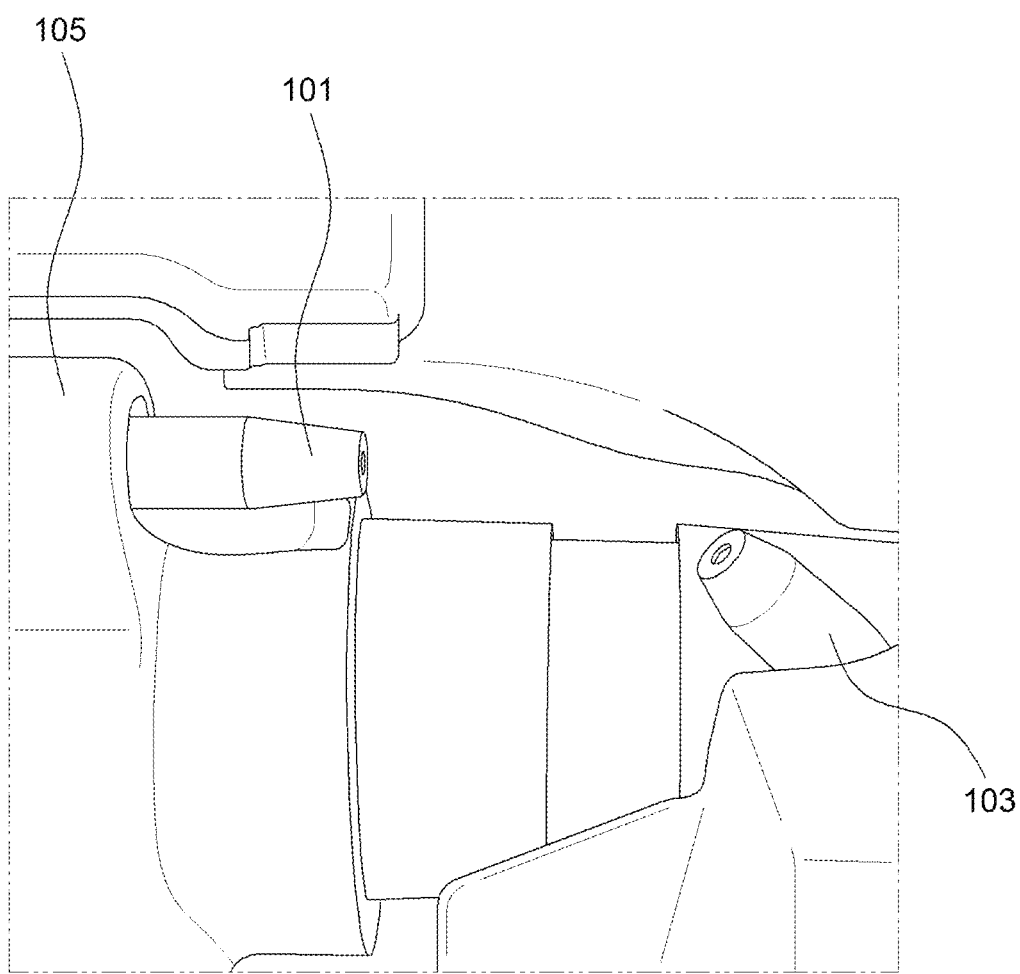
FIG. 4A is a photograph of a mold core, a mold core pin, and a drive core pin which are used to fix both ends of a pipe according to various embodiments of the present invention.
Figure 4B:
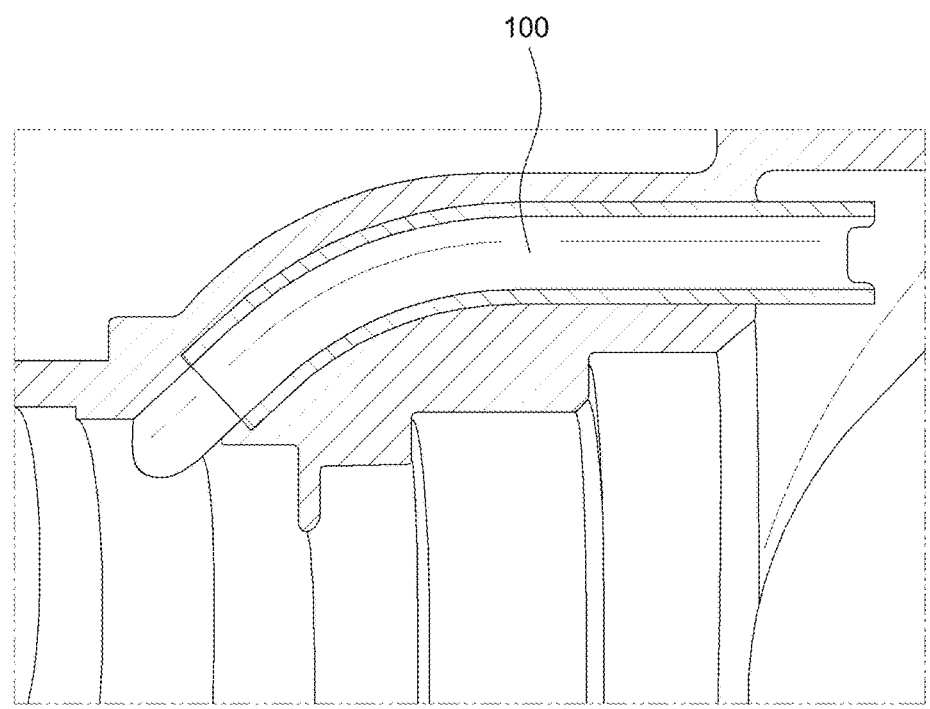
FIG. 4B is a photograph of the pipe fixed by the mold core pin and the drive core pin according to various embodiments of the present invention.
Figure 4C:
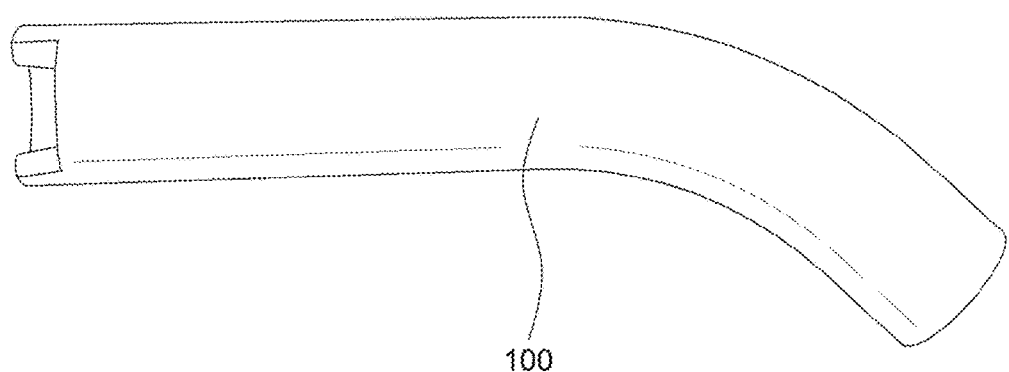
FIG. 4C is a photograph of the pipe connected to the mold core pin and the drive core pin according to various embodiments of the present invention.

FIG. 4A is a photograph of the mold core, the mold core pin 101, and the drive core pin 103 which are used to fix both ends of the pipe 100 according various embodiments of the present invention, FIG. 4B is a photograph of the pipe 100 fixed by the mold core pin 101 and the drive core pin 103 according to various embodiments of the present invention, and FIG. 4C is a photograph of the pipe 100 connected to the mold core pin 101 and the drive core pin 103 according to various embodiments of the present invention. According to a pipe fixing step according to various embodiments of the present invention, one end of the pipe 100 is inserted into the mold core 105, and the pipe 100 is inserted into the mold core pin 101 fixed to the mold core 105 so as to fix the mold core 105 and one end of the pipe 100, such that one end of the pipe 100 is fixed so that the pipe 100 cannot be rotated, and as a result, the pipe 100 is subjected to the single-axis fixing step and the two-axis fixing step. With the drive core pin 103 which is inserted into the other end of the pipe 100, the other end of the pipe 100 is fixed on the three axes, and as a result, the pipe 100 is subjected to a three-axis fixing step. According to various embodiments of the present invention, after the three-axis fixing step, the method includes a high pressure casting step in which molten metal is casted by being injected into the mold core 105 under high pressure, and a shape of the differential carrier case is made after a solidification step.

Figure 5A:
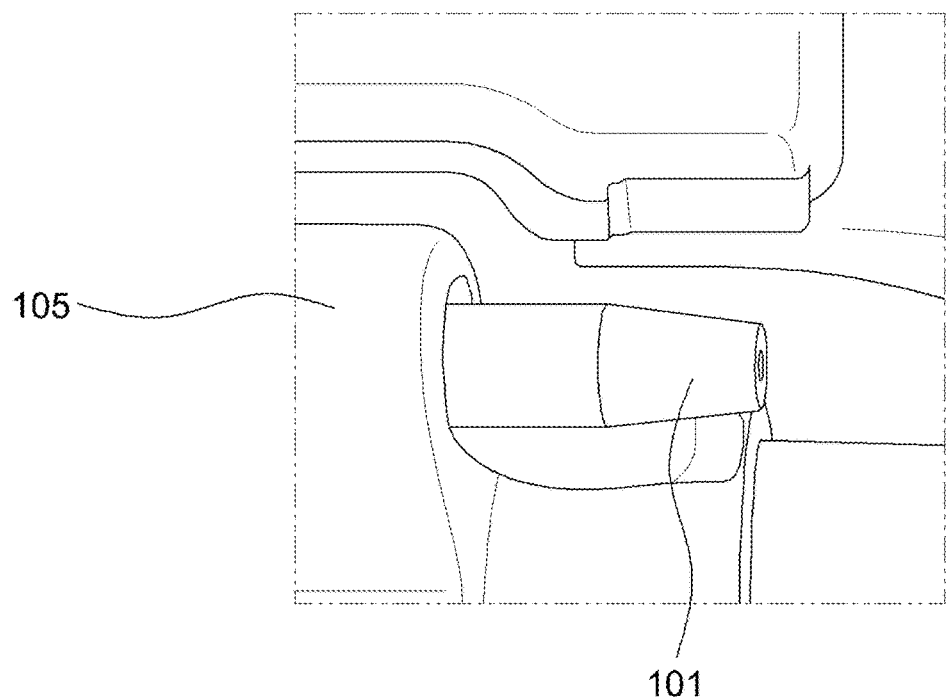
FIG. 5A is an enlarged photograph of the mold core and the mold core pin according to various embodiments of the present invention.
Figure 5B:
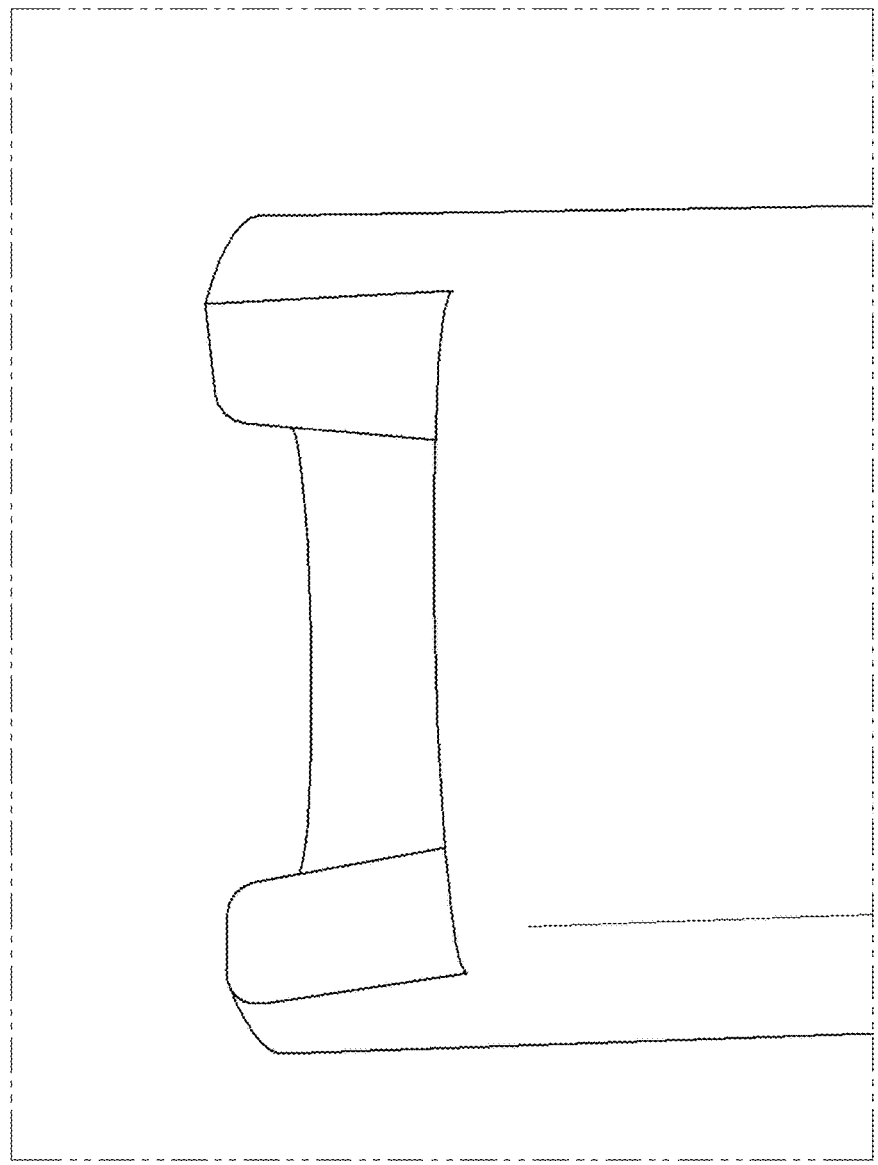
FIG. 5B is an enlarged photograph of the machined pipe according to various embodiments of the present invention.

FIG. 5A is an enlarged photograph of the mold core 105 and the mold core pin 101 according to various embodiments of the present invention, and FIG. 5B is an enlarged photograph of the machined pipe 100 according to various embodiments of the present invention.

FIGS. 5A and 5B may be enlarged photographs of FIGS. 4A and 4C. According to the pipe fixing step according to various embodiments of the present invention, one end of the pipe 100 is inserted into the mold core 105, and the pipe 100 is inserted into the mold core pin 101 fixed to the mold core 105 so as to fix the mold core 105 and one end of the pipe 100, such that one end of the pipe 100 is fixed so that the pipe 100 cannot be rotated, and as a result, the pipe 100 is subjected to the single-axis fixing step and the two-axis fixing step and then fixed.

Figure 6A:
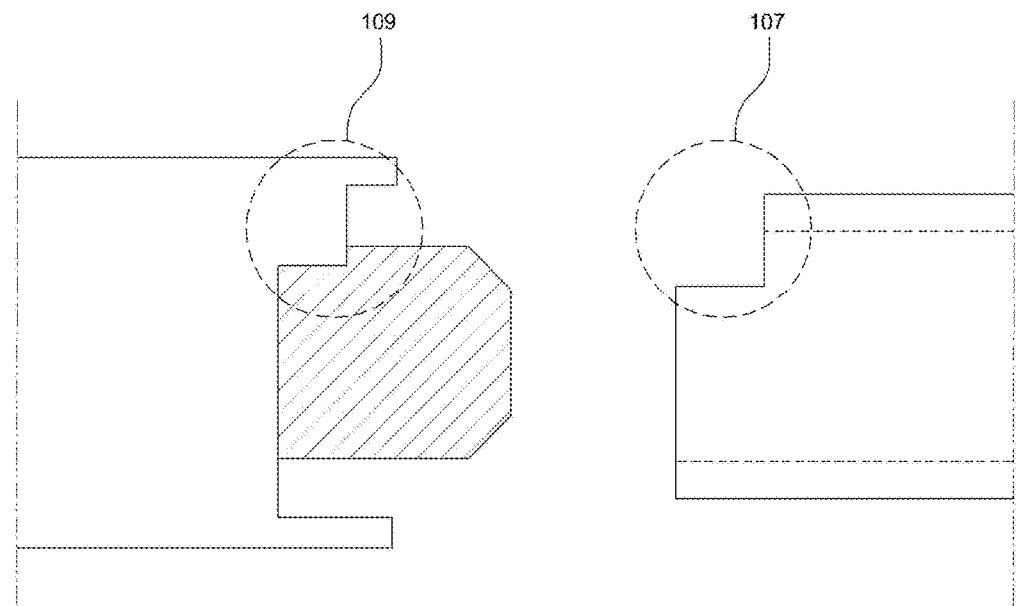
FIG. 6A is a configuration diagram before the pipe is inserted into the mold core pin according to various embodiments of the present invention.
Figure 6B:
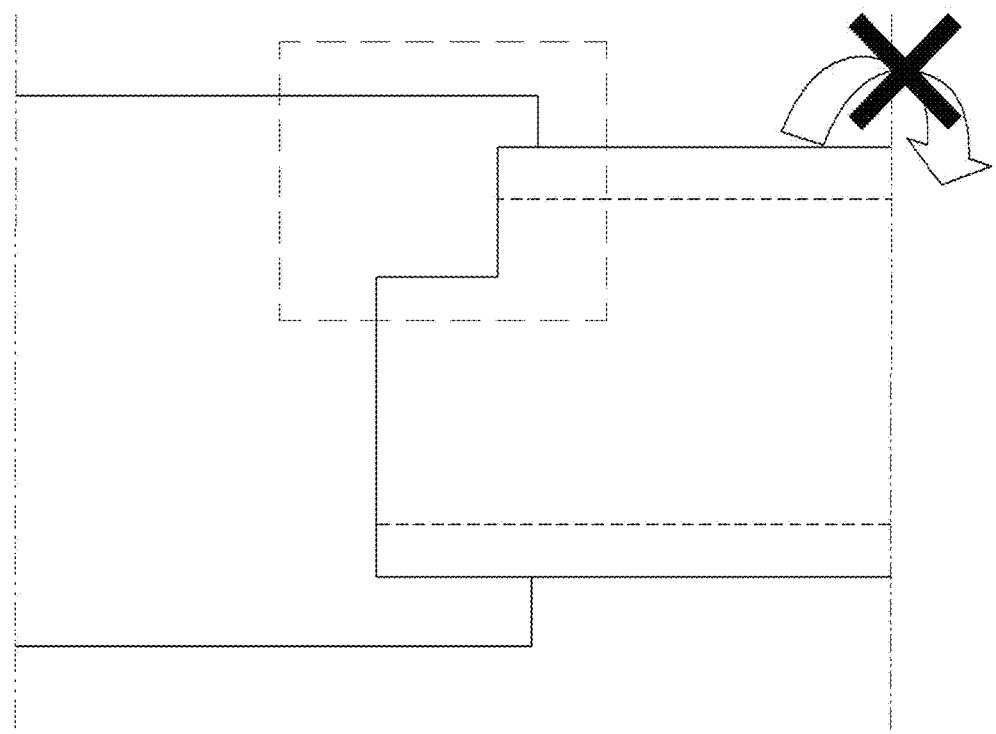
FIG. 6B is a configuration diagram after the pipe is inserted into the mold core pin according to various embodiments of the present invention.

FIG. 6A is a configuration diagram before the pipe 100 is inserted into the mold core pin 101 according to various embodiments of the present invention, and FIG. 6B is a configuration diagram after the pipe 100 is inserted into the mold core pin 101 according to various embodiments of the present invention. As can be seen from FIGS. 6A and 6B, one end of the pipe 100 is inserted into the mold core 105, and the pipe 100 is inserted and fixed to the mold core pin 101 fixed to the mold core 105 so as to fix the mold core 105 and one end of the pipe 100, such that the pipe 100 is subjected to the two-axis fixing step, and as a result, the pipe 100 is not rotated by molten metal during the process of injecting the molten metal. More specifically, referring to FIGS. 6A and 6B, one end of the pipe 100 according to various embodiments of the present invention is processed to have the first concave-convex portion 107, the portion of the mold core 105 into which one end of the pipe 100 is inserted is processed to have the second concave-convex portion 109, and thus the first concave-convex portion 107 at one end of the pipe 100 and the second concave-convex portion 109 of the mold core 105 are coupled and fixed. As described above, one end of the pipe 100 is fixed so that the pipe 100 cannot be rotated, and as a result, the pipe 100 is subjected to the single-axis fixing step and the two-axis fixing step and then fixed.

Figure 10A:
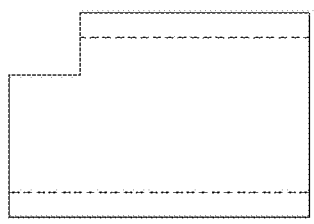
FIG. 10A, FIG. 10B, and FIG. 10C are configuration diagrams of a two-axis fixing method of fixing the pipe having a concave-convex portion formed at one end of the pipe according to various embodiments of the present invention.
Figure 10B:
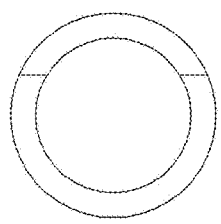
Figure 10C:
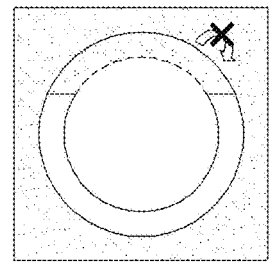
Figure 11A:
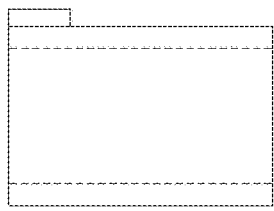
FIG. 11A, FIG. 11B, and FIG. 11C are configuration diagrams of a two-axis fixing method of the pipe in which a protruding portion is additionally formed on an outer diameter portion at one end of the pipe according to various embodiments of the present invention.
Figure 11B:
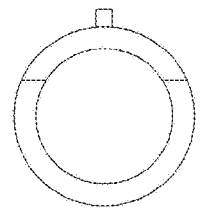
Figure 11C:
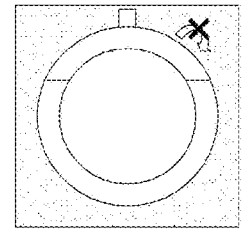
Figure 12A:
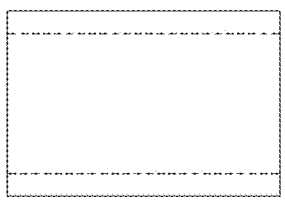
FIG. 12A, FIG. 12B, and FIG. 12C are configuration diagrams of a two-axis fixing method in which one end of the pipe according to various embodiments of the present invention is formed in a quadrangular shape and fixed.
Figure 12B:
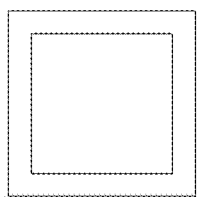
Figure 12C:
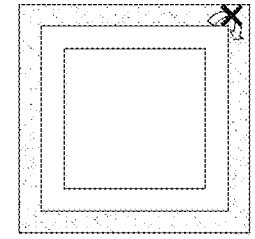
Figure 13A:
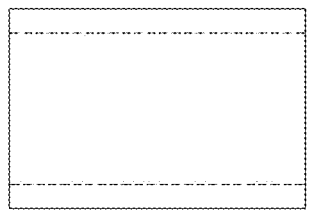
FIG. 13A, FIG. 13B, and FIG. 13C are configuration diagrams of a two-axis fixing method of the pipe in which one end of the pipe according to various embodiments of the present invention is formed in an elliptical shape and fixed.
Figure 13B:
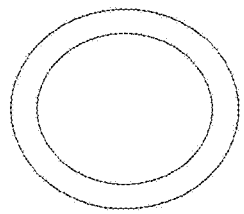
Figure 13C:
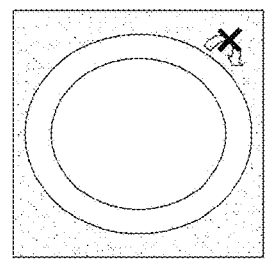

FIGS. 10A-10C are configuration diagram of the two-axis fixing method of fixing the pipe 100 having the concave-convex portion formed at one end of the pipe 100 according to various embodiments of the present invention, that is, a configuration diagram of the two-axis fixing method of fixing the pipe 100 in accordance with FIGS. 6A and 6B. FIGS. 11A-11C are configuration diagrams of the two-axis fixing method of the pipe 100 in which the protruding portion is additionally formed on the outer diameter portion at one end of the pipe 100 according to various embodiments of the present invention and fixed, FIGS. 12A-12C are configuration diagrams of the two-axis fixing method of the pipe 100 in which one end of the pipe 100 is formed in a quadrangular shape and fixed according to various embodiments of the present invention, and FIGS. 13A-13C are configuration diagrams of the two-axis fixing method of the pipe 100 in which one end of the pipe 100 is formed in an elliptical shape and fixed according to various embodiments of the present invention.

That is, the protruding portion is additionally formed on the outer diameter portion at one end of the pipe 100 according to the present invention, and the depressed portion is formed in the mold core 105 so as to have a shape corresponding to the protruding portion, and as a result, one end of the pipe 100 may be inserted and fixed to the mold core 105, and one end of the pipe 100 may be formed in a quadrangular shape and then inserted and fixed to the mold core 105. In addition, one end of the pipe 100 may be formed in an elliptical shape and then inserted and fixed to the mold core 105.

More specifically, FIG. 10A is a configuration diagram of a front surface of the pipe 100 including the concave-convex portion, FIG. 10B is a cross-sectional configuration diagram of the pipe 100 including the concave-convex portion, and FIG. 10C is a cross-sectional configuration diagram illustrating a state in which the pipe 100 including the concave-convex portion is fastened to the mold core 105. In addition, FIG. 11A is a configuration diagram of a front surface of the pipe 100 having the protruding portion additionally formed on the outer diameter portion at one end of the pipe 100, FIG. 11B is a cross-sectional configuration diagram of the pipe 100 having the protruding portion additionally formed on the outer diameter portion at one end of the pipe 100, and FIG. 11C is a cross-sectional configuration diagram illustrating a state in which the pipe 100 having the protruding portion additionally formed on the outer diameter portion at one end of the pipe 100 is fastened to the mold core 105 having the depressed portion formed therein to have a shape corresponding to the protruding portion. Moreover, FIG. 12A is a configuration diagram of a front surface of the pipe 100 having the quadrangular shape formed at one end of the pipe 100, FIG. 12B is a cross-sectional configuration diagram of the pipe 100 having the quadrangular shape formed at one end of the pipe 100, and FIG. 12C is a cross-sectional configuration diagram illustrating a state in which the pipe 100 having the quadrangular shape formed at one end of the pipe 100 is fastened to the mold core 105. Moreover, FIG. 13A is a configuration diagram of a front surface of the pipe 100 having the elliptical shape formed at one end of the pipe 100, FIG. 13B is a cross-sectional configuration diagram of the pipe 100 having the elliptical shape formed at one end of the pipe 100, and FIG. 13C is a cross-sectional configuration diagram illustrating a state in which the pipe 100 having the elliptical shape formed at one end of the pipe 100 is fastened to the mold core 105.

Figure 7A:
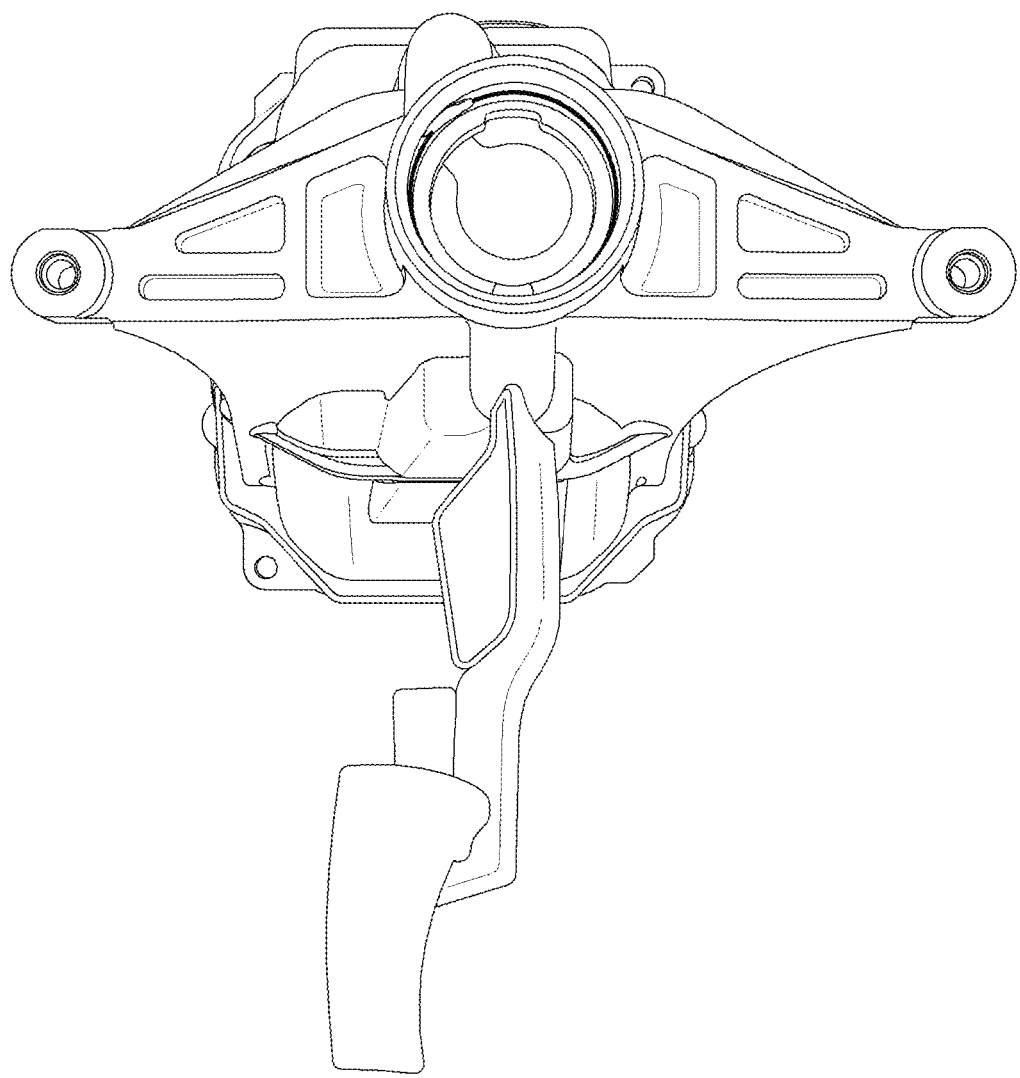
FIG. 7A is a photograph of a front surface of the differential carrier case with the inserted pipe for high pressure casting according to various embodiments of the present invention.
Figure 7B:
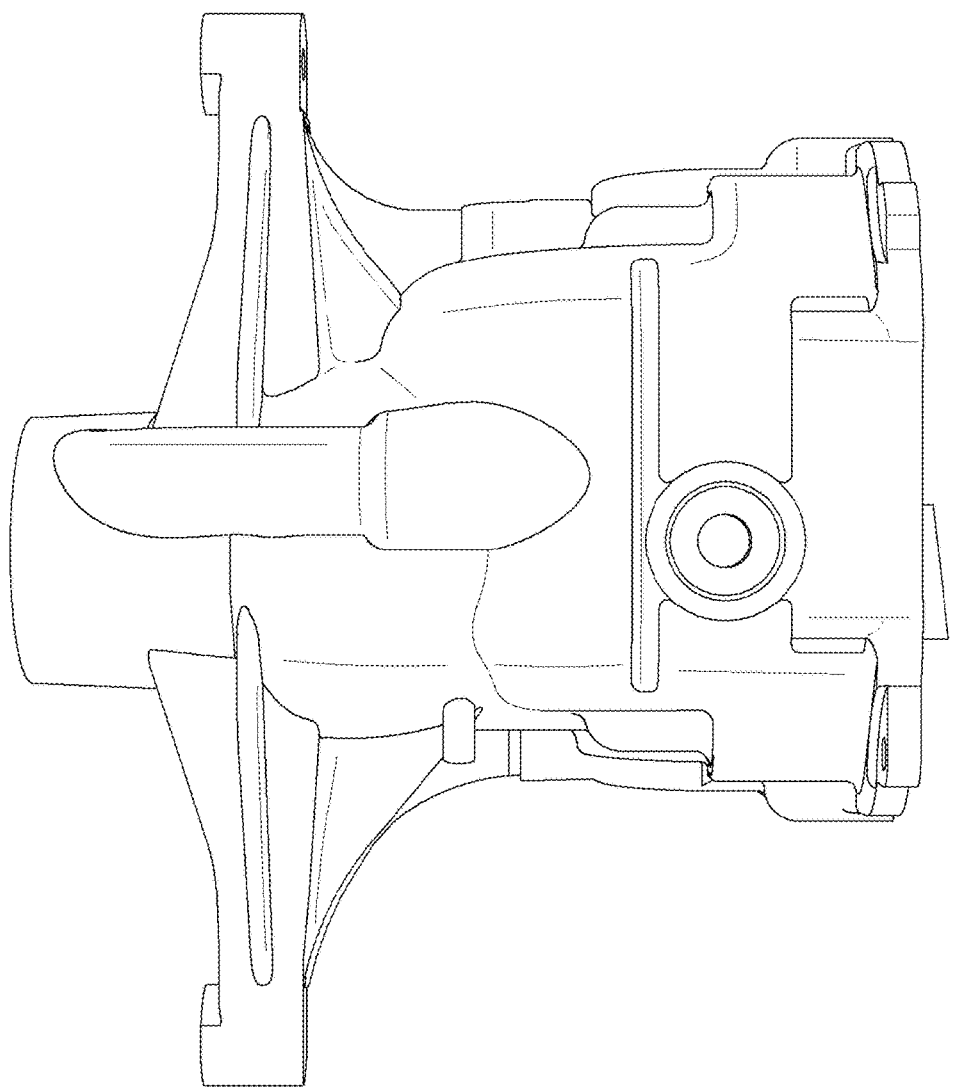
FIG. 7B is a photograph of an upper end surface of the differential carrier case with the inserted pipe for high pressure casting according to various embodiments of the present invention.
Figure 7C:
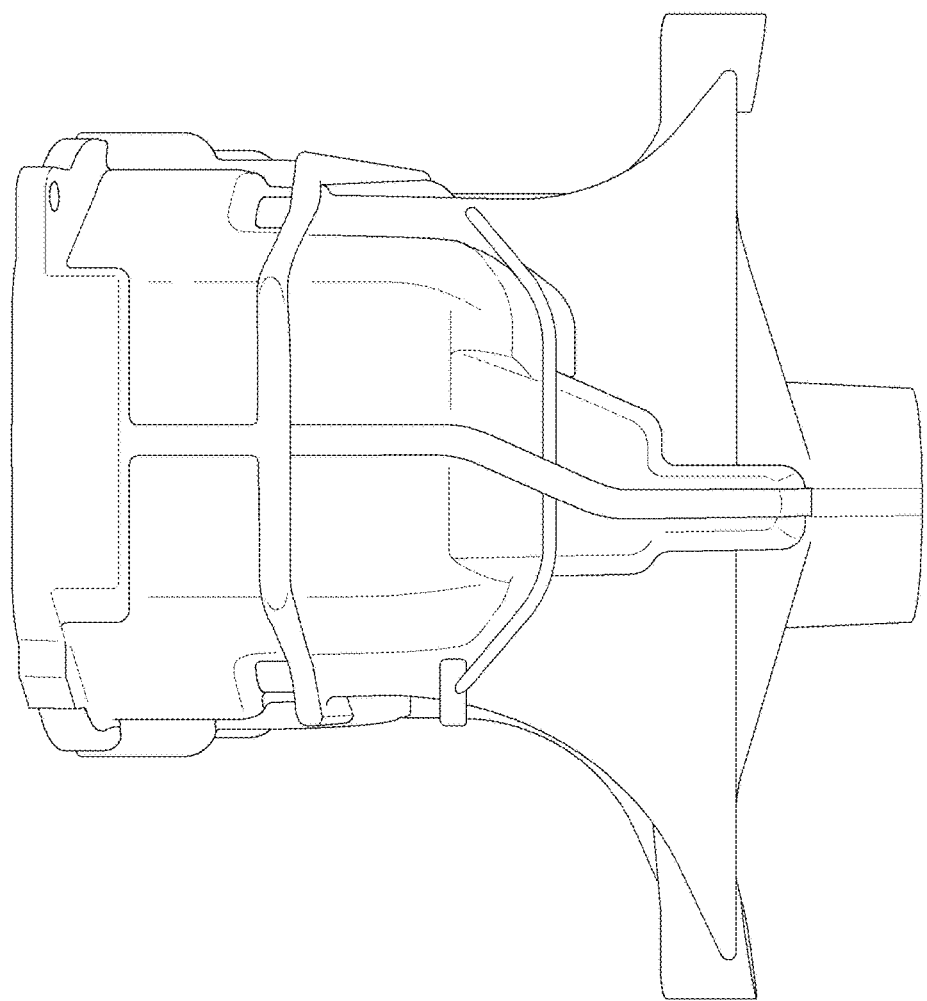
FIG. 7C is a photograph of a rear surface of the differential carrier case with the inserted pipe for high pressure casting according to various embodiments of the present invention.

FIG. 7A is a photograph of a front surface of the differential carrier case with the inserted pipe 100 for high pressure casting according to various embodiments of the present invention, FIG. 7B is a photograph of an upper end surface of the differential carrier case with the inserted pipe 100 for high pressure casting according to various embodiments of the present invention, and FIG. 7C is a photograph of a rear surface of the differential carrier case with the inserted pipe 100 for high pressure casting according to various embodiments of the present invention. As can be seen from FIGS. 7A, 7B, and 7C, the pipe and the fixing device are not exposed to the outside unlike the differential carrier case in the related art. In the differential carrier case according to various embodiments of the present invention, the pipe is not exposed to the outside because the pipe itself is fixed, and since the pipe is inserted and fixed by the mold core pin and the drive core pin, there is no problem of oil leakage and water leakage, and corrosion resistance is ensured.

Figure 8:
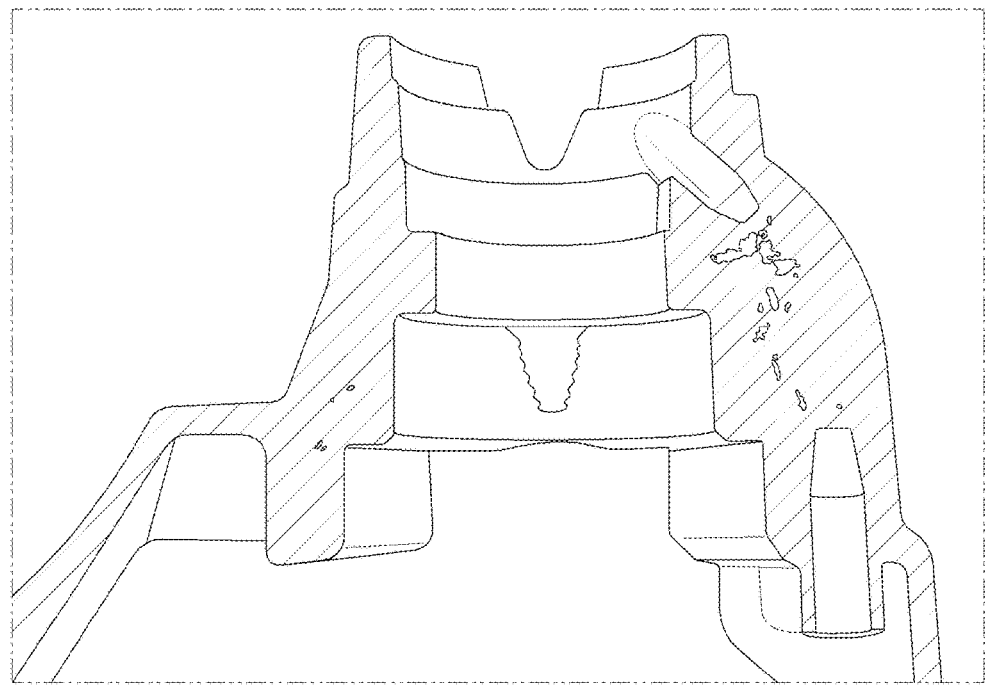
FIG. 8 is a photograph of a differential carrier case for high pressure casting in the related art into which no pipe is inserted.

FIG. 8 is a photograph of a differential carrier case for high pressure casting in the related art into which no pipe 10 is inserted. As can be seen from FIG. 8 in the related art, in a case in which no pipe is inserted, the shrinkage defect 111 occurs due to a small thickness. For this reason, oil leakage and water leakage also occur, and as a result, it is difficult to manufacture a component having a thick portion where a lubricating oil passageway is present. Furthermore, there is a problem in that durability and quality of the final product deteriorate even though the high pressure casting process is applied to a small component.

Figure 9:
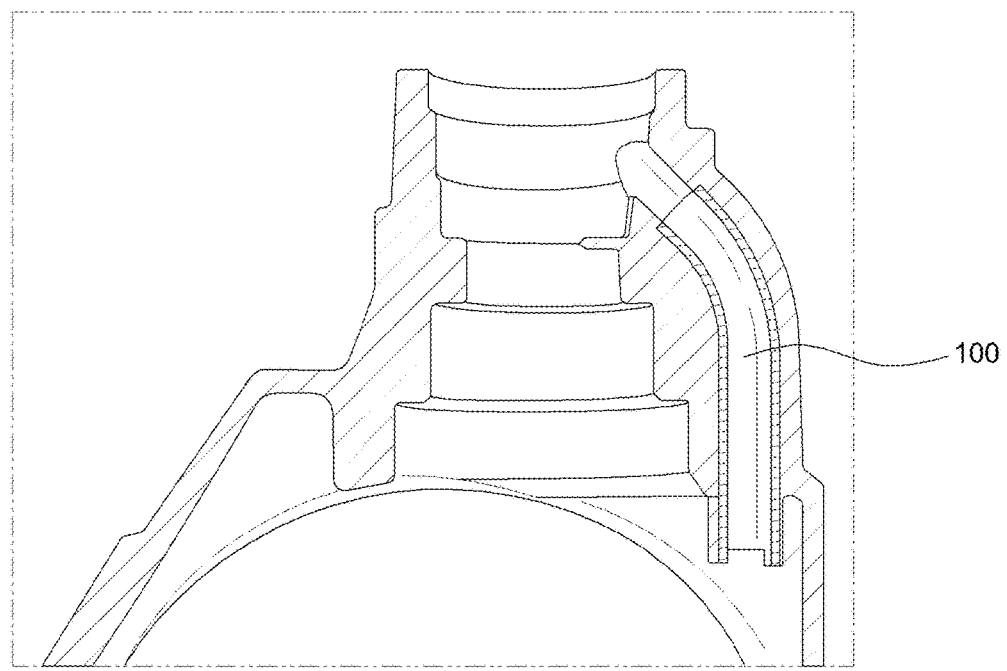
FIG. 9 is a photograph of the differential carrier case with the inserted pipe for high pressure casting according to various embodiments of the present invention.

FIG. 9 is a photograph of the differential carrier case with the inserted pipe 100 for high pressure casting according to various embodiments of the present invention. In a case in which the pipe according to the present invention is inserted, and the high pressure casting process is applied as illustrated in FIG. 9, the thick portion may be manufactured, and oil leakage and water leakage do not occur. In this case, because molten metal is injected at a high speed and under high pressure, the pipe 100 inserted into the mold needs to be necessarily securely fixed in order to inhibit scattering of molten metal and oil leakage, and ensure a dimension of the product at the periphery of the pipe.

Therefore, the differential carrier case made of the aluminum alloy according to various embodiments of the present invention is manufactured by using the high pressure casting process, the lubricating oil passageway in the differential carrier case is manufactured by inserting the pipe instead of the existing right-angled machining hole, and the pipe 100 inserted into the mold is fixed on the three axes by the mold core pin 101 and drive core pin 103 in the mold, and as a result, a change in clearance or dimension of the pipe 100 does not occur during the process of injecting molten-metal. Furthermore, since there is no external fixing device connected to the pipe 100, there is no problem of outside exposure of the pipe, internal oil leakage, and water leakage.

Figure 14:
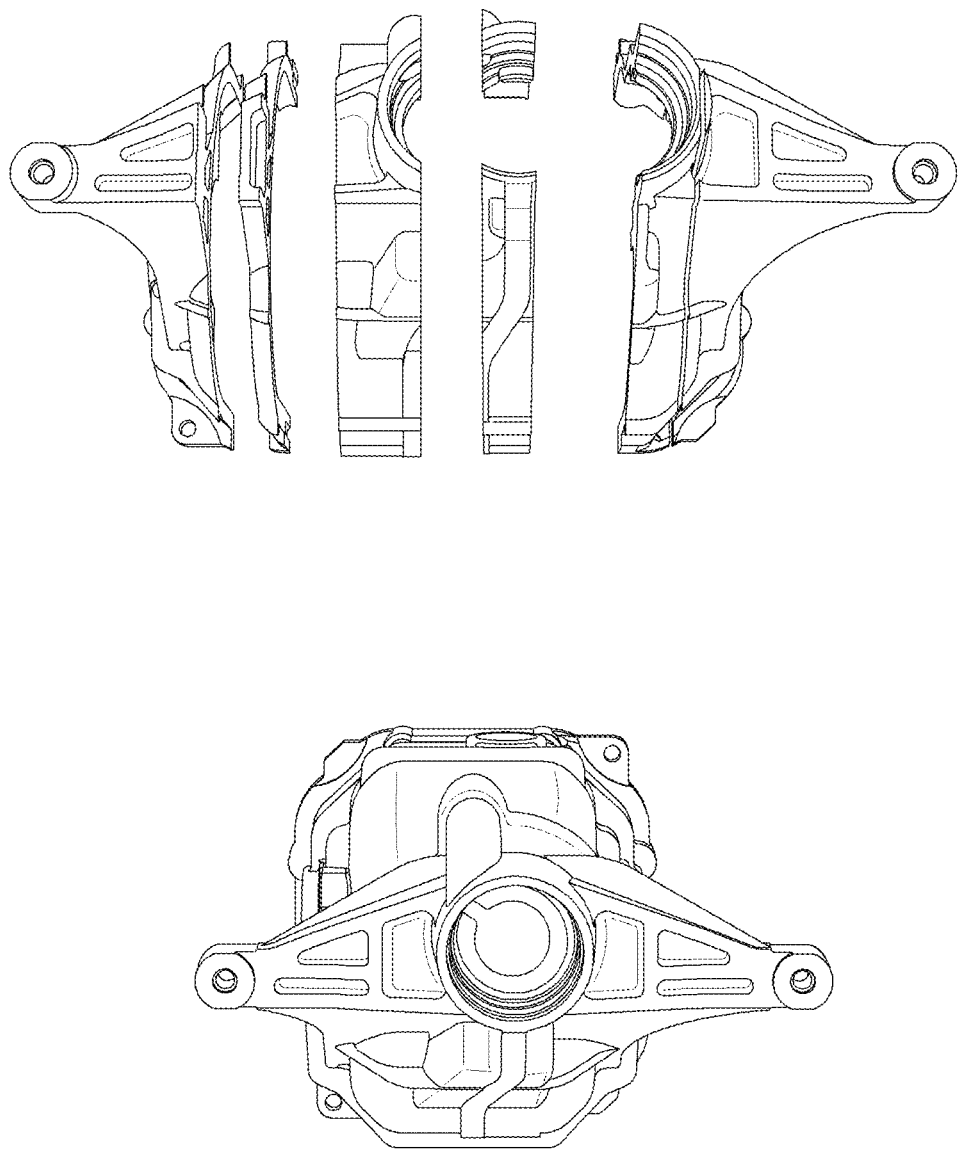
FIG. 14 is a photograph of the differential carrier case according to various embodiments of the present invention before and after a cutting inspection.

FIG. 14 is a photograph of the differential carrier case according to various embodiments of the present invention before and after a cutting inspection. A lower part in FIG. 14 illustrates the front surface of the differential carrier case according to the present invention before the cutting inspection, and an upper part in FIG. 14 illustrates a state in which components are arranged after the cutting inspection. FIG. 15 is a photograph of a cutting inspection for a front portion of the differential carrier case according to various embodiments of the present invention. As can be seen from FIGS. 14 and 15, the shrinkage defect, oil leakage, and water leakage do not occur at all portions including the portion into which the pipe 100 is inserted and a portion which is finally filled, and states of all of the portions are good.

FIGS. 16A-16E are computerized tomography (CT) photographs of the differential carrier case with the inserted pipe 100 for high pressure casting according to various embodiments of the present invention. Referring to FIG. 15, it can be seen that the shrinkage defect 111, or oil and water leakage does not occur along the thick portion of the differential carrier case according to various embodiments of the present invention. FIG. 16A is a photograph of a front surface of the differential carrier case with an inserted pipe for high pressure casting according to various embodiments of the present invention, FIG. 16B is a CT photograph of part b in the photograph in FIG. 16A, FIG. 16C is a CT photograph of part c in the photograph in FIG. 16A, FIG. 16D is a CT photograph of part d in the photograph in FIG. 16A, and FIG. 16E is a CT photograph of part e in the photograph in FIG. 16A. As can be seen from the CT photographs, no defect is present in the differential carrier case according to various embodiments of the present invention, and a state of the differential carrier case is good.

Figure 17A:
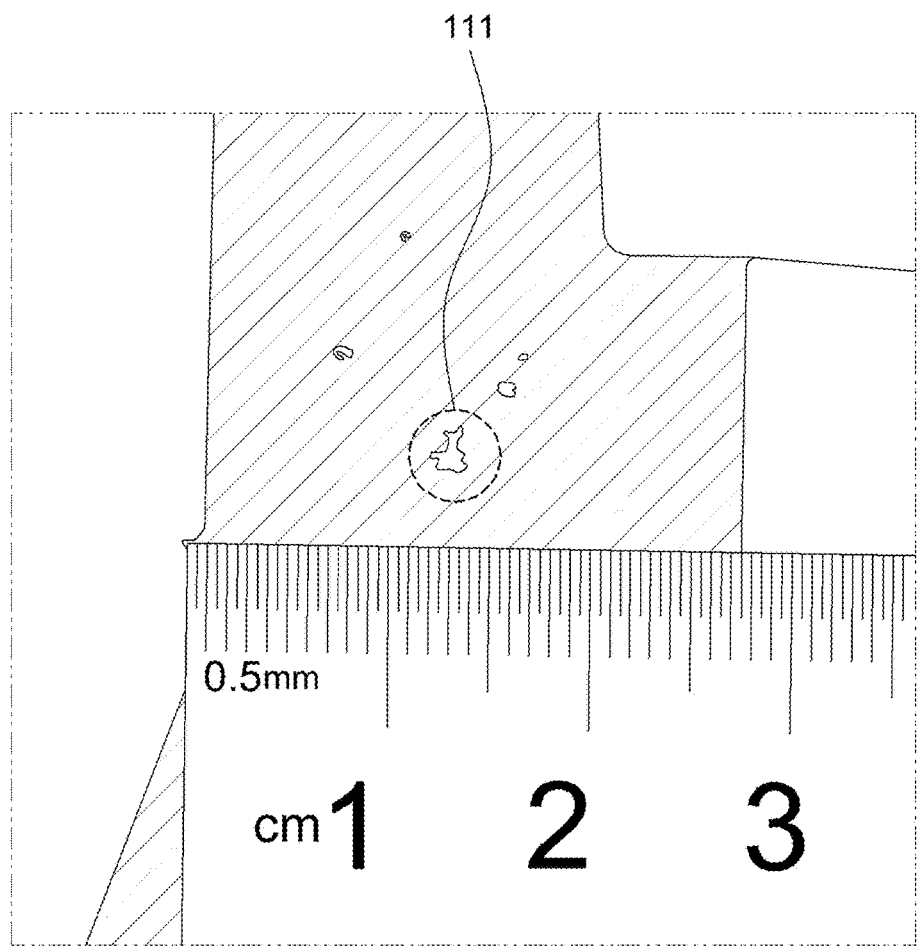
FIG. 17A is an enlarged photograph illustrating a shrinkage defect of aluminum having a thickness of 28 mm in the related art.
Figure 17B:
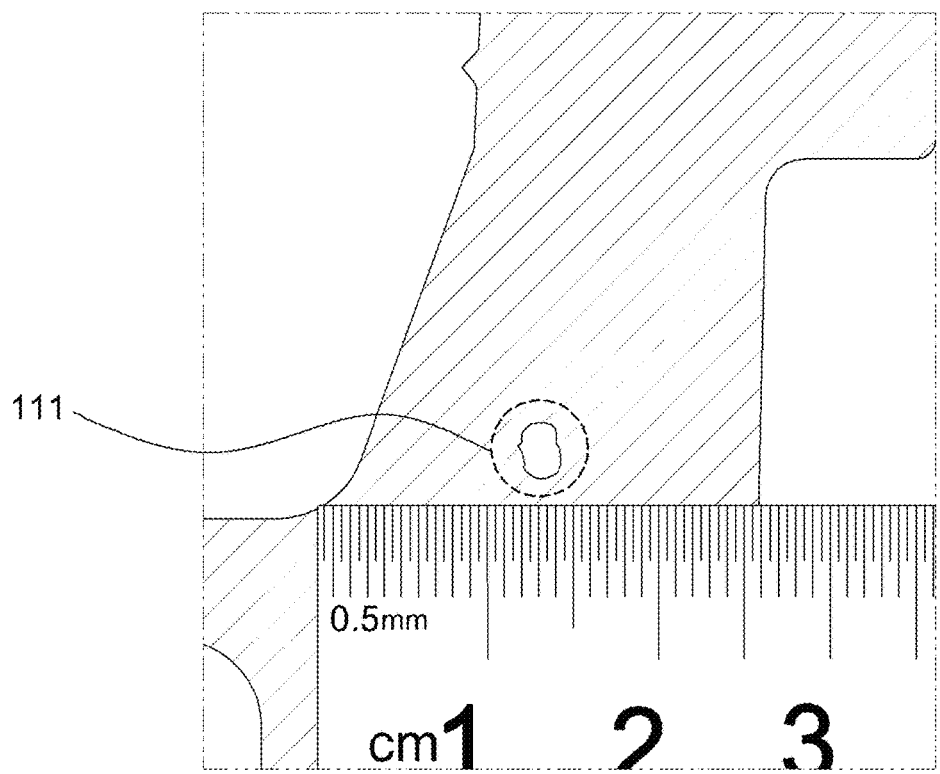
FIG. 17B is an enlarged photograph illustrating a shrinkage defect of aluminum having a thickness of 26 mm in the related art.

FIG. 17A is an enlarged photograph illustrating a shrinkage defect 111 of aluminum having a thickness of 28 mm in the related art, and FIG. 17B is an enlarged photograph illustrating a shrinkage defect 111 of aluminum having a thickness of 26 mm in the related art. As can be seen from FIGS. 17A and 17B, the shrinkage defect 111 occurs when the high pressure casting process is applied in a state in which a thickness of aluminum is 26 mm or larger. However, the thick portion may be formed as a result of applying the pipe 100 to the differential carrier case for high pressure casting according to various embodiments of the present invention. In the related art, unlike a thickness of a component for the gravity casting process, it is difficult to form a component having a thickness of 10 mm or larger in the high pressure casting process, and the shrinkage defect 111 occurs due to the thick portion even though the high pressure casting is carried out, but in a case in which the pipe 100 according to various embodiments of the present invention, which is not exposed to the outside, is inserted, it can be seen that the high pressure casting process is enabled without the shrinkage defect 111 at the components having any thickness, and the component having the thick portion, which cannot be formed because of being limited by the thickness, may be formed. In addition, in various embodiments of the present invention, the differential carrier case is manufactured by using typical carbon steel, stainless steel, and an aluminum alloy by changing the material of the pipe 100. Furthermore, the material applied to the thick portion is not limited to the aluminum alloy, and a magnesium alloy may be included.

TABLE 1

| Material | Component (wt. %) | | | | | | | | | |
| --- | --- | --- | --- | --- | --- | --- | --- | --- | --- | --- |
| | C | Si | Mn | P | S | Ni | Cr | Mg | Fe | Al |
| Carbon Steel | 0.016 | 0.002 | 0.203 | 0.007 | 0.005 | — | — | — | — | — |
| Stainless Steel | 0.055 | 0.357 | 1.045 | 0.031 | 0.005 | 8.040 | 18.080 | — | Bal. | — |
| Aluminum | — | 0.050 | — | — | — | — | — | 0.010 | 0.060 | Bal. |

Table 1 illustrates materials of the pipe 100 according to various embodiments of the present invention, and as can be seen from Table 1, the pipe according to various embodiments of the present invention may be manufactured by using carbon steel, stainless steel, and an aluminum alloy. In Table 1, the carbon steel includes C (carbon), Si (silicon), Mn (manganese), P (phosphorus), and S (sulfur), the stainless steel contains C, Si, Mn, P, S, Ni (nickel), Cr (chromium), and Fe (iron), and the aluminum includes Si, Mg (magnesium), Fe, and Al (aluminum).

TABLE 2

| | Physical Property | | |
| --- | --- | --- | --- |
| Material | Yield Strength (MPa) | Maximum Tensile Strength (MPa) | Elongation Percentage (%) |
| Carbon Steel | 270 | 381 | 30 |
| Stainless Steel | 306 | 647 | 57 |
| Aluminum | 72 | 63 | 32 |

Table 2 illustrates physical properties of materials of the pipe according to the present invention. According to Table 2, the carbon steel has yield strength of 270 MPa, maximum tensile strength of 381 MPa, and elongation percentage of 30%. In addition, the stainless steel has yield strength of 306 MPa, maximum tensile strength of 647 MPa, and elongation percentage of 57%. Furthermore, the aluminum has yield strength of 72 MPa, maximum tensile strength of 63 MPa, and elongation percentage of 32%. As can be seen from Table 2, the stainless steel is highest in all of the yield strength, the maximum tensile strength, and the elongation percentage, and the aluminum is significantly lower in physical properties of yield strength, and maximum tensile strength than other materials. However, it can be seen that the aluminum has a slightly higher elongation percentage than the carbon steel.

TABLE 3

| Material | Weight (g) | Pipe Properties | | | | Reactivity with Molten Metal | |
|---|---|---|---|---|---|---|---|
| | | Formability | Fixedness | Weldability | Workability | Thermal Deformability | Interface Quality |
| Carbon Steel | 22.1 | Good | Good | Very Good | Fair | Very Good | Fair |
| Stainless Steel | 22.5 | Good | Good | Good | Fair | Very Good | Fair |
| Aluminum | 7.8 | Very Good | Fair | Fair | Very Good | Bad | Very Good |

Table 3 illustrates weights, respective properties, and reactivity with molten metal of materials of the pipe according to various embodiments of the present invention. It can be seen that the pipe manufactured by using an aluminum material is lightest in weight, and the pipe manufactured by using stainless steel is heaviest. In addition, regarding properties of the pipe, formability and workability of the aluminum material is best compared to those of other materials. However, fixedness and weldability of the aluminum material is lowest compared to those of other materials. Furthermore, regarding reactivity with molten metal, the aluminum material has no thermal deformability, and has most excellent interface quality compared to other materials.

It can be seen that the pipes manufactured by using carbon steel and stainless steel are excellent in properties of formability, fixedness, and weldability, but have lower workability than the pipe made of aluminum. In addition, regarding reactivity with molten metal, the carbon steel and the stainless steel have low interface quality, and very high thermal deformability.

More specifically, in a case in which the high pressure casting process is applied, the shrinkage defect 111 occurs when a thickness of aluminum is 26 mm or larger, but in the present invention, the pipe 100 is inserted without an external fixing device, and as a result, it is possible to inhibit a shrinkage defect. Therefore, in the present invention, it is possible to manufacture the differential carrier case, which may be manufactured by the high pressure casting process, without the shrinkage defect 111 caused by the thick portion in a state in which in which a thickness of the thick portion is 2.0 mm to 35.0 mm.

As described above, the present invention relates to the aluminum differential carrier case for high pressure casting to which a technology of inserting the pipe 100 is applied, and the lubricating oil passageway existing in the differential carrier case is substituted with the pipe 100, and the high pressure casting process is applied as a manufacturing process.

According to the present invention, the pipe 100 itself is fixed without an external fixing device, such that the pipe 100 may withstand the high pressure casting process, and the pipe 100 is configured and implemented as a component of the differential carrier case.

The pipe 100 according to various embodiments of the present invention may prevent oil leakage and corrosion because there is no outside exposure of a fixing device, and enables casting of a thick portion, which was difficult to be implemented in the high pressure casting process, and as a result, the shrinkage defect 111 along the thick portion does not occur any longer. Furthermore, the differential carrier case may be changed in design corresponding to the shape of the pipe 100, and as a result, there is no interference with adjacent components.

As described above, the differential carrier case made of an aluminum alloy according to various embodiments of the present invention is manufactured by using the high pressure casting process. The lubricating oil passageway in the differential carrier case is manufactured by inserting the pipe 100 instead of the existing right-angled machining hole, and the pipe 100 inserted in the mold is fixed on the two axes and the three axes, by the mold core pin 101 and the drive core pin 103 which are fixing devices in the mold, and as a result, a change in clearance or dimension of the pipe 100 does not occur during the process of injecting molten metal. Furthermore, since there is no external fixing device 11 connected to the pipe 100, there is no problem of outside exposure of the pipe 100, internal oil leakage, and water leakage. As the structure having no external fixing device 11 connected to the pipe 100, one end of the pipe 100 is processed to have a concave-convex portion, a quadrangular shape, or a circular shape, or a protruding portion is inserted into one end of the pipe 100, thereby preventing the autonomous rotation of the pipe 100. In various embodiments of the present invention, the pipe 100 itself may be fixed on the two axes by fixing one end of the pipe 100 and preventing the rotation of the pipe 100, and the pipe 100 may be fixed on the three axes by fixing the other end of the pipe 100.

The thick portion may be formed as a result of applying the pipe 100 to the differential carrier case for high pressure casting. In the related art, unlike a thickness of a component for the gravity casting process, it is difficult to form a component having a thickness of 10 mm or larger in the high pressure casting process, and the shrinkage defect 111 occurs due to the thick portion even though the high pressure casting is carried out. However, in a case in which the pipe 100 according to various embodiments of the present invention, which is not exposed to the outside, is inserted, it can be seen that the high pressure casting process is enabled without the shrinkage defect 111 at the components having any thickness, and the component having the thick portion, which cannot be formed because of a limitation of thickness, may be formed. In addition, in the present invention, the differential carrier case is manufactured by using typical carbon steel, stainless steel, and an aluminum alloy by changing the material of the pipe 100. Furthermore, the material applied to the thick portion is not limited to the aluminum alloy, and a magnesium alloy is included.

Therefore, in various embodiments of the present invention, the pipe 100 itself may be fixed on the three axes without an external fixing device for a pipe in comparison with the related art, and the pipe 100 is inserted solely, and as a result, an additional process for the pipe 100 is not required, thereby reducing costs. More specifically, since there is no external fixing device for the pipe 100 and thus the pipe is not exposed to the outside of the component, it is not necessary to use a silicone cap used in the related art, and to seal a portion of the pipe exposed to the outside in order to perform ancillary work such as painting, and as a result, the number of processes is reduced, thereby reducing costs. The outside exposure of the external fixing device 11 for the pipe 10 causes problems such as corrosion, oil leakage, and water leakage, but in various embodiments of the present invention, the pipe 100 is basically prevented from being exposed to the outside, and as a result, it is possible to manufacture a product having good quality, corrosion resistance, and anti-corrosive performance. In addition, the thick portion (thick component) may be formed by inserting the pipe 100, and the occurrence of the shrinkage defect 11 is basically prevented, and as a result, a defect rate is decreased, thereby reducing costs.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A differential carrier case with an inserted pipe for pressure casting, the differential carrier case comprising:
   a mold core into which a first end of the pipe is inserted;
   a mold core pin fixed to the mold core wherein the first end of the pipe is connected to the mold core pin;
   a drive core pin inserted into a second end of the pipe
   a first portion of the differential carrier case, the first portion surrounding an outer portion of the pipe.

2. The differential carrier case of claim 1, wherein the first end of the pipe is formed to have a first concave-convex portion, and a portion of the mold core into which the first end of the pipe is inserted is formed to have a second concave-convex portion, such that the first concave-convex portion at the first end of the pipe and the second concave-convex portion of the mold core are fixedly coupled.

3. The differential carrier case of claim 1, wherein a protruding portion is additionally formed on an outer diameter at the first end of the pipe, such that the first end of the pipe is inserted and fixed to the mold core.

4. The differential carrier case of claim 1, wherein the first end of the pipe is formed in a quadrangular shape, and inserted and fixed to the mold core.

5. The differential carrier case of claim 1, wherein the first end of the pipe is formed in an elliptical shape, and inserted and fixed to the mold core.

6. The differential carrier case of claim 1, wherein a material of the pipe is selected from the group consisting of an aluminum alloy, carbon steel, and stainless steel.

7. The differential carrier case of claim 1, wherein the first portion is selected from the group consisting of an aluminum alloy and a magnesium alloy.

8. The differential carrier case of claim 1, wherein a thickness of the first portion ranges from 2.0 mm to 35.0 mm.

9. A method of manufacturing a differential carrier case with an inserted pipe, the method comprising:
   fixing of the pipe, in which a first end of the pipe is inserted into a mold core, and the pipe is inserted and fixed to a mold core pin fixed to the mold core;
   fixing of the pipe, in which the pipe is fixed by a drive core pin inserted into a second end of the pipe; and
   pressure casting, in which molten metal is casted by being injected into the mold core.

* * * * *